US008838862B2

(12) United States Patent
Sasaki

(10) Patent No.: US 8,838,862 B2
(45) Date of Patent: Sep. 16, 2014

(54) DATA TRANSFER DEVICE, METHOD OF TRANSFERRING DATA, AND IMAGE FORMING APPARATUS

(75) Inventor: Fumihiro Sasaki, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 277 days.

(21) Appl. No.: 13/137,453

(22) Filed: Aug. 17, 2011

(65) Prior Publication Data

US 2012/0047299 A1    Feb. 23, 2012

(30) Foreign Application Priority Data

Aug. 23, 2010 (JP) ................................ 2010-186551

(51) Int. Cl.
*G06F 13/362* (2006.01)

(52) U.S. Cl.
CPC .......... *G06F 13/362* (2013.01); *G06F 13/3625* (2013.01)
USPC .......................................... 710/113; 710/117

(58) Field of Classification Search
USPC .................. 710/107, 113, 117, 240, 241, 244
See application file for complete search history.

(56) References Cited

U.S. PATENT DOCUMENTS

| | | | | |
|---|---|---|---|---|
| 4,860,200 | A * | 8/1989 | Holmbo | 710/269 |
| 4,972,313 | A * | 11/1990 | Getson et al. | 710/125 |
| 5,349,690 | A * | 9/1994 | Frame et al. | 710/107 |
| 5,621,897 | A | 4/1997 | Boury et al. | |
| 6,654,833 | B1 | 11/2003 | LaBerge | |
| 8,065,458 | B2 * | 11/2011 | Nagao et al. | 710/244 |
| 2002/0072391 | A1 * | 6/2002 | Itoh et al. | 455/557 |
| 2004/0073733 | A1 * | 4/2004 | LaBerge | 710/117 |
| 2004/0170274 | A1 * | 9/2004 | Machida et al. | 380/46 |
| 2008/0215782 | A1 * | 9/2008 | Mochida et al. | 710/117 |

FOREIGN PATENT DOCUMENTS

| | | |
|---|---|---|
| EP | 0 737 924 | 10/1996 |
| JP | 05046540 A | 2/1993 |
| JP | 9297731 A | 11/1997 |
| JP | 4024484 B2 | 9/2002 |
| JP | 2003-256359 A | 9/2003 |
| JP | 2005-242718 A | 9/2005 |
| JP | 2007-066324 B2 | 3/2007 |
| JP | 2008-165547 A | 7/2008 |

OTHER PUBLICATIONS

Search Report dated Nov. 28, 2011 issued in corresponding European Application No. 11177989.8.
English language abstract for JP-2002-269032 which corresponds to JP-4024484-B2.
English language abstract for JP-2007-066324 which corresponds to JP-2007-066324-B2.

* cited by examiner

*Primary Examiner* — Nimesh G Patel
(74) *Attorney, Agent, or Firm* — Harness, Dickey & Pierce, P.L.C.

(57) ABSTRACT

A data transfer device controls data transfer performed through a bus capable of separately processing a request and a response. The data transfer device include a plurality of access control units that produce a data transfer process according to the request; and an arbitration unit that performs arbitration between the requests issued by the plurality of access control units so as to determine a request to be accepted among those requests. The arbitration unit sets an arbitration prohibited period in which the arbitration is prohibited for a designated period and accepts only the request issued by a designated access control unit among the plurality of access control units during the arbitration prohibited period.

6 Claims, 18 Drawing Sheets

DATA TRANSFER DEVICE, METHOD OF TRANSFERRING DATA, AND IMAGE FORMING APPARATUS

CROSS-REFERENCE TO RELATED APPLICATIONS

The present application claims priority to and incorporates by reference the entire contents of Japanese Patent Application No. 2010-186551 filed in Japan on Aug. 23, 2010.

BACKGROUND OF THE INVENTION

1. Field of the Invention

The present invention relates to a data transfer device, a method of transferring data, and an image forming apparatus that control data transfer that is performed by a plurality of direct memory access controllers (DMACs) through one bus.

2. Description of the Related Art

In a case where a large-scale integration (LSI) includes a plurality of DMACs therein and the plurality of DMACs accesses one bus, generally, an arbitrating mechanism (arbiter) for the DMACs is arranged inside the LSI so as to improve transfer performance of the LSI. In addition, it is usual to provide the arbiter with a mechanism which assures performance by setting a high priority on acceptance of a request from a DMAC that is responsible for data transfer such as video transfer for which time limitation is strict and setting a relatively low priority on acceptance of a request from a DMAC that is responsible for data transfer to perform a process such as a compression/decompression process or a rotation process, for which time limitation is not strict and which is performed in parallel with a video transfer process.

A data transfer process using a plurality of DMACs having different priorities will be briefly described with reference to FIG. 18. As illustrated in FIG. 18, a controller LSI 300 and a central processing unit (CPU) 302 are interconnected through a bus 301 that is, for example, compliant with peripheral component interconnect bus express (PCI Express) specifications, and the CPU 302 and a memory 304 are interconnected through a bus 303. The PCI Express specifications support split transaction in which a request and a response are separately processed, and accordingly, a next request can be issued without waiting for a response for a previous request.

The controller LSI 300 includes a plurality of DMACs 310a, 310b, 310c and 310d having different priorities. In addition, the controller LSI 300 includes: an arbiter 311 that arbitrates data transfer of the plurality of DMACs 310a to 310d; a PCIe I/F 312 that is an interface for the bus 301; and a transmission data buffer 313 that performs buffering of transfer data.

For example, in the controller LSI 300, the arbiter 311 arbitrates read requests to the memory 304 that are transmitted from the DMACs 310a to 310d based on the priorities to transmit the read requests to the CPU 302 through the bus 301. The CPU 302 reads out data from the memory 304 through the bus 303 in response to the requests and transmits the read-out data to the controller LSI 300 through the bus 301.

In order to support the split transaction, the plurality of DMACs 310a to 310d can respectively issue a request without waiting for a response. When read data is normally transferred, as illustrated in FIG. 18 as an example, the DMACs 310a to 310d can issue their respective read requests 320a to 320d for reading out read data 330a to 330d from the memory 304 without waiting for the responses of the read data 330a to 330d. Accordingly, the transfer through the bus 301 can be efficiently performed.

In addition, Japanese Patent Application Laid-open No. 2003-256359 discloses a technique in which a direct memory access (DMA) arbitrating mechanism based on priorities is provided, and in a case where a request for starting DMA transfer is received while another DMAC is operating, if the priority of the requested DMA transfer is higher than that of the DMAC, a channel to be disengaged is selected in accordance with content of a process of the transfer and the priority of the DMAC that is in the middle of operation.

However, in a conventional arbiter mechanism, it is not rare that a request from a DMAC having a high priority, is not allowed to be received for a long time, which makes it difficult to satisfy a limitation of data transfer time, resulting in an abnormality occurring in the data transfer. Such an abnormality in the data transfer appears as an image abnormality in a case where the transfer data is image data, for example.

The data transfer resulting in an abnormal image being generated will be briefly described with reference to FIG. 19. In the above-described split transaction, there is an upper limit of number of requests, which can be issued without waiting for a response, due to practical restriction when implementing a circuit. Accordingly, in a state in which current number of requests, which has been issued and a response to which has not been received, reaches an upper limit, the DMACs 310a to 310d are not allowed to issue a new request to the arbiter 311 until a transaction started from the request that is currently waiting for a response is completed.

Accordingly, an abnormal image is generated in a case where the following conditions (1) and (2) are satisfied together.

Condition (1): A state is reached in which a DMAC having a high priority among the DMACs 310a to 310d, is not allowed to issue a new read request.

Condition (2): A size of data to be transferred according to a write request issued by a DMAC having a low priority among the DMACs 310a to 310d is large, or there are a plurality of write requests issued by a DMAC having a low priority.

Referring to FIG. 19, it is assumed that the number of the requests, which has been issued and a response to which has not been received, reaches the upper limit at a time point when the DMAC (here, the DMAC 310a) having a high priority issues a read request 340a, and a state is reached in which the DMAC 310a is not allowed to issue a new read request, whereby Condition (1) is satisfied. By receiving a response to the read request 340a, the DMAC 310a can issue the next read request.

In addition, it is assumed that, in the state in which the DMAC 310a having a high priority is not allowed to issue a new read request, a write request 341 made by a DMAC (here, a DMAC 310b) having a low priority is allowed by the arbiter 311. The write request 341 causes transfer of write data packet that includes write data to be written into the memory 304. Since a size of data to be transferred as a write request is generally larger than a size of data to be transferred as a read request, in a case where a size of the write data included in a write request packet is large, Condition (2) is satisfied.

When a response (read data 342a) to the read request 340a made by the DMAC 310a having a high priority is received by the DMAC 310a after Conditions (1) and (2) are satisfied as above, a state is reached in which the DMAC 310a can issue a next read request 340b, and issuance of the read request 340b is allowed by the arbiter 311. Meanwhile, a write request 341 made by the DMAC 310b having a low priority is accepted by the arbiter 311, before the read request 340b is issued. Accordingly, the read request 340b is transmitted after completion of transmission of the write request 341.

When once such a state is reached, the same sequence is repeated any number of times as long as the write request is continuously repeated from the DMAC 310b. As a result, data transfer performance for a read request made by the DMAC 310b having a high priority is degraded, and a limitation on data transfer time may not be satisfied. For example, in a case where continuity between the read data 342a responding to the read request 340a issued first by the DMAC 310a and read data 342b responding to the read request 340b issued next is required, the required continuity between the read data 342a and the read data 342b may not be obtained. Such a problem may occur in a case of a technique disclosed in Japanese Patent Application Laid-open No. 2003-256359 described above as well.

SUMMARY OF THE INVENTION

It is an object of the present invention to at least partially solve the problems in the conventional technology.

According to an aspect of the present invention, there is provided a data transfer device that controls data transfer performed through a bus capable of separately processing a request and a response, the data transfer device including: a plurality of access control units that produce a data transfer process according to the request; and an arbitration unit that performs arbitration between the requests issued by the plurality of access control units so as to determine a request to be accepted among those requests. The arbitration unit sets an arbitration prohibited period in which the arbitration is prohibited for a designated period and accepts only the request issued by a designated access control unit among the plurality of access control units during the arbitration prohibited period.

According to another aspect of the present invention, there is provided a method of transferring data that controls data transfer performed through a bus capable of separately processing a request and a response, the method including: producing, by an access control unit, a data transfer process according to the request; and arbitrating, by an arbitration unit, the requests, which are issued by a plurality of times of the producing, so as to determine a request to be accepted among those requests. In the arbitrating, an arbitration prohibited period in which the arbitrating is prohibited for a designated period is set, and only the request issued in a designated time of the producing among the plurality of times of the producing is accepted during the arbitration prohibited period.

According to still another aspect of the present invention, there is provided An image forming apparatus including: a storage unit that stores image data; an image forming unit that forms an image on a sheet based on the image data; and a data transfer device that controls data transfer performed through a bus capable of separately processing a request and a response and that controls data transfer of the image data read out from the storage unit to the image forming unit. The data transfer device including: a plurality of access control units that produce a data transfer process according to the request; and an arbitration unit that performs arbitration between the requests issued by the plurality of access control units so as to determine a request to be accepted among those requests. The arbitration unit sets an arbitration prohibited period in which the arbitration is prohibited for a designated period and accepts only the request issued by a designated access control unit among the plurality of access control units during the arbitration prohibited period.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
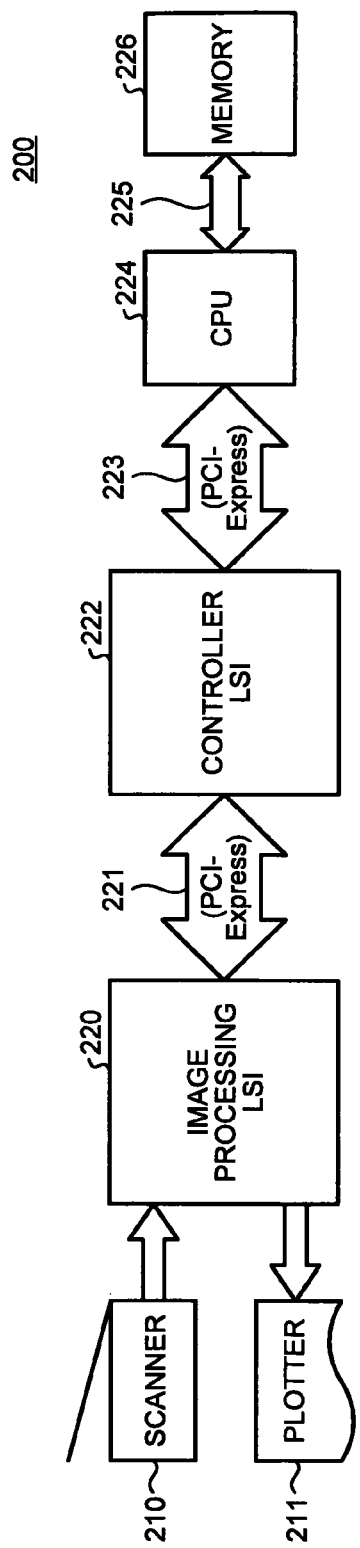
FIG. 1 is a block diagram illustrating a configuration of an example of an image forming apparatus that can be applied to each embodiment.

Hereinafter, data transfer devices according to embodiments of the invention will be described in detail with reference to the accompanying drawings. FIG. 1 illustrates a configuration of an example of an image forming apparatus 200 that can be applied to each embodiment. The image forming apparatus 200 includes a copying function in which predetermined image processing is performed for image data acquired by scanning an original by using a scanner 210, and image forming is performed to a sheet based on the image data, for which the image processing has been performed, by using a plotter 211.

An image processing large-scale integration (LSI) 220 performs predetermined image processing on image data. A controller LSI 222 is connected to the image processing LSI 220 through a bus 221 that is compliant with peripheral component interconnect bus express (PCI Express) specifications and is connected to a central processing unit (CPU) 224 through a bus 223 that is also complaint with the PCI Express specifications. A memory 226 is connected to the CPU 224 through a bus 225. The memory 226 is used, for example, to temporarily store the image data for which image processing has been performed by the image processing LSI 220.

Figure 2:
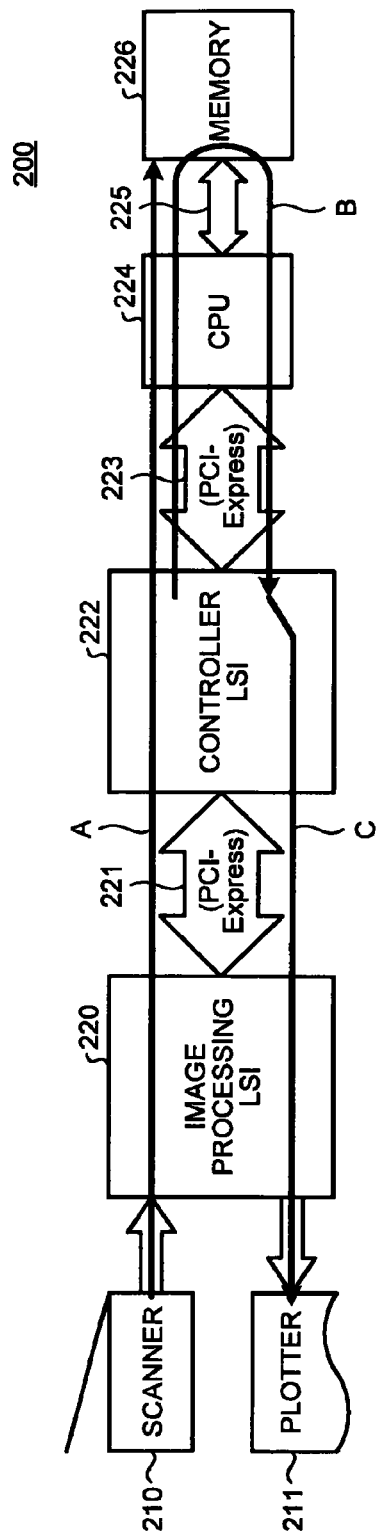
FIG. 2 is a schematic diagram illustrating a data flow when a copying function is performed in the image forming apparatus.

FIG. 2 schematically illustrates a data flow when a copying function is performed in the image forming apparatus 200. In FIG. 2, the same reference numeral is assigned to a portion that is common to FIG. 1 described above, and detailed description thereof will not be presented here. Referring to a path A, when an image is scanned, the scanner 210 transfers image data acquired by scanning an original to the image processing LSI 220 through an interface not illustrated in the figure. The image processing LSI 220 performs predetermined image processing on the transferred image data and transfers the processed image data to the controller LSI 222. The controller LSI 222 transfers the image data, which has been transmitted from the image processing LSI 220, to the CPU 224 through the bus 223 in predetermined units together with a write request to the memory 226. The CPU 224 transfers the image data to the memory 226 in response to the write request transferred from the controller LSI 222.

Referring to a path B, when an image is formed, the controller LSI 222 transfers a read request to request to read out image data, which has been transferred to the memory 226, for each predetermined unit to the CPU 224 through the bus 223. At this time, it is necessary to issue and transfer the read request in synchronization with an image forming operation in the plotter 211. The CPU 224 reads out the image data from the memory 226 through the bus 225 in predetermined units in response to the read request. The read-out image data divided into predetermined units is transferred from the CPU 224 to the controller LSI 222 through the bus 223.

Referring to a path C, the controller LSI 222 transfers the predetermined unit of the image data, which has been transferred from the CPU 224, to the image processing LSI 220 through the bus 221. The image processing LSI 220 performs predetermined image processing on the transferred image data and transfers the processed image data to the plotter 211 through an interface not illustrated in the figure, for example, in units of lines. The plotter 211 forms an image on a sheet in units of lines based on the transferred image data while feeding the sheet at a predetermined speed, for example.

As above, in the image forming apparatus 200, it is necessary to read image data from the memory 226 at a time of image formation in synchronization with an image forming speed of the plotter 211. Accordingly, there is a limitation on a data transfer time of transfer of image data read out from the memory 226. In a case where such a limitation is not satisfied, there is a concern that normal image forming cannot be performed in the plotter 211.

Figure 3:
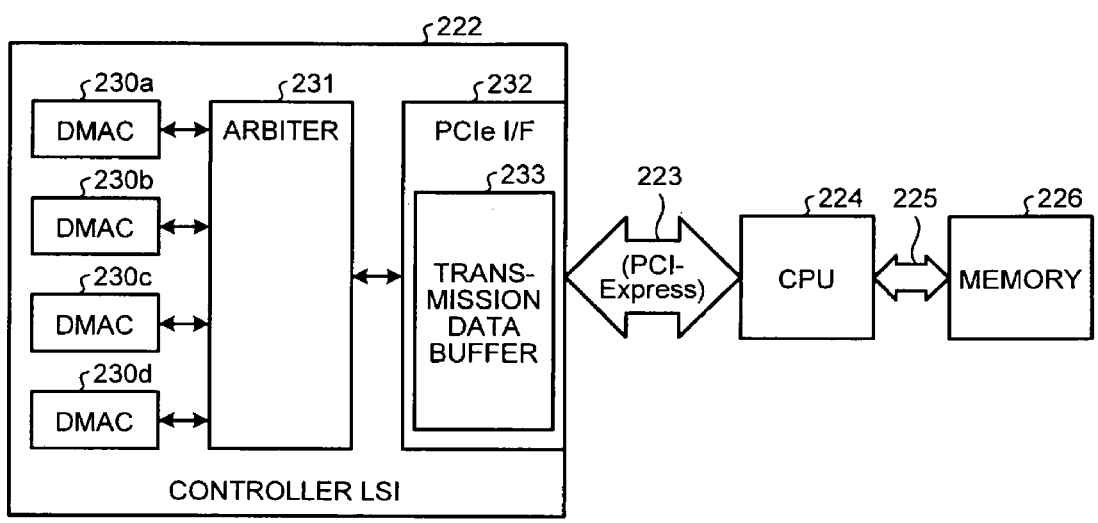
FIG. 3 is block diagram illustrating a configuration of an example of a controller LSI that can be applied to each embodiment.

FIG. 3 illustrates a configuration of an example of a controller LSI 222 that can be applied to each embodiment. In FIG. 3, the same reference numeral is assigned to a portion that is common to FIG. 1 described above, and detailed description thereof will not be presented here. The controller LSI 222 includes a plurality of DMACs 230a, 230b, 230c, and 230d, an arbiter 231, and a PCIe I/F 232 that is an interface for a bus 223. In addition, the PCIe I/F 232 includes a transmission data buffer 233 inside thereof.

Here, the bus 223, as described above, is compliant with the PCI Express specifications. The PCI Express specifications, as described in relation to the conventional technique, supports a split transaction in which a request and a response are separately processed. In other words, a next request can be issued to the bus 223 without waiting for a response to a previous request.

The PCIe I/F 232 is an interface for the bus 223 and controls a transaction that is compliant to the PCI Express specifications. At this time, the PCIe I/F 232 absorbs, for example, a difference between a timing, at which data is transmitted and received between the PCIe I/F 232 and the arbiter 231, and a timing, at which data is transmitted and received between the PCIe I/F 232 and the bus 223, by using the transmission data buffer 233.

Each of the DMACs 230a to 230d gets permission to use the bus 223 from the CPU 224 through issuance of a read/write request, generates addresses of a data transfer source and a data transfer destination that are required for data transfer, in order to produce a data transfer process. Here, each of the DMACs 230a to 230d supports the split transaction and can issue next requests up to a predetermined number, which depends on circuit implementation, without waiting for a response to a previous request.

The arbiter 231 arbitrates requests transmitted from the DMACs 230a to 230d. In addition, priorities of requests from the DMACs 230a to 230d are set in advance in the arbiter 231. In a case where a plurality of requests are simultaneously transmitted from the DMACs 230a to 230d and the requests made by the DMACs 230a to 230d conflict with one another, the arbiter 231 issues the request having a highest priority to the PCIe I/F 232 based on the priorities. In a case where requests transmitted from the DMACs 230a to 230d do not conflict with one another, the arbiter 231 directly issues a received request to the PCIe I/F 232.

Next, an example of a data transfer process to which any embodiment of the invention is not applied will be described with reference to a timing diagram illustrated in FIG. 4. Here, requests A, B, C, and D represent whether there are requests received from the DMACs 230a, 230b, 230c, and 230d by the arbiter 231. A high state of the signal represents that there is a request from the corresponding DMAC 230a to 230d, and a low state thereof represents that there is no request from the corresponding DMAC 230a to 230d. When the arbiter 231 accepts a request from the DMACs 230a to 230d, the arbiter 231 changes a signal corresponding to the received request from the high state to the low state.

Here, it is assumed that the DMAC 230a is a read DMAC (RDMAC) that requests to read data from the memory 226, and the other DMACs 230b to 230d are write DMACs (WDMACs) that request to write data into the memory 226. In addition, in the arbiter 231, among requests issued by the DMACs 230a to 230d, the priority of the read request transmitted from the DMAC 230a as the read DMAC is assumed to be set higher than those of the write requests transmitted from the other DMACs 230b to 230d. Furthermore, it is assumed that, among the write requests, the request transmitted from the DMAC 230b has a highest priority, and the request transmitted from the DMAC 230d has a lowest priority.

Hereinafter, as appropriate, the DMAC 230a is referred to as a high priority RDMAC, and the DMACs 230b to 230d are referred to as low priority WDMACs. In addition, a read request that is issued from the high priority RDMAC is referred to as a request A, and write requests issued from the low priority WDMACs are referred to as requests B, C, and D.

A transmission bus is a path in which data is transmitted from the controller LSI 222 to the CPU 224 in the bus 223, and a reception bus is a path in which data is transmitted from the CPU 224 to the controller LSI 222 in the bus 223. In the transmission bus, a packet denoted by "A" is a read request packet according to the request A, and packets denoted by "B," "C," and "D" are write request packets according to the requests B, C, and D, respectively.

The read request packet includes only a read request. On the other hand, a write request packet includes a write request and write data to be written into the memory 226 according to the write request. Thus, generally, a packet size of the write request packet is larger than that of the read request packet.

The reception bus is a path in which data is transmitted from the CPU 224 to the controller LSI 222 in the bus 223. In the reception bus, a packet denoted by "A" is a read data packet responding to the read request packet that is transmitted to the transmission bus in accordance with the read request from the high priority RDMAC. For example, in response to a read request packet 110 transmitted to the transmission bus in accordance with a read request A 100, a read data packet 112 is transmitted to the reception bus.

When the read request A 100 is issued to the arbiter 231, a read request packet 110 corresponding to that request is transmitted to the transmission bus with a delay of read issuing delay #1. The read issuing delay #1 corresponding to the read request A 100 is an internal delay in a state in which another request is not accepted by the arbiter 231, and a request packet other than the read request packet 110 according to the read request A 100 is not transmitted in the transmission bus. This read issuing delay #1 depends on an internal configuration of the controller LSI 222, congestion status of the bus 223, and the like.

Meanwhile, in the reception bus, a read data packet 112 responding to the read request (for example, the read request A 100) that has been already issued by the high priority RDMAC is transmitted from the CPU 224 and is received by the PCIe I/F 232. In this reception of the read data packet 112, a period from timing at which a latest request is issued to timing at which a response to the request, the response to which from the CPU 224 is waited, is received by the arbiter 231, that is, timing at which the request is responded by the CPU 224 is called a read response delay.

During a period of the read response delay, the high priority RDMAC cannot issue a new read request. For example, after the read data packet 112 is received with a delay of the read response delay from a time of the read request A 100, the high priority RDMAC can issue a next read request A102. In a case where there is no confliction with another request to the memory 226, the read response delay depends on characteristics of the CPU 224 and the memory 226 that the CPU 224 accesses.

Figure 4:
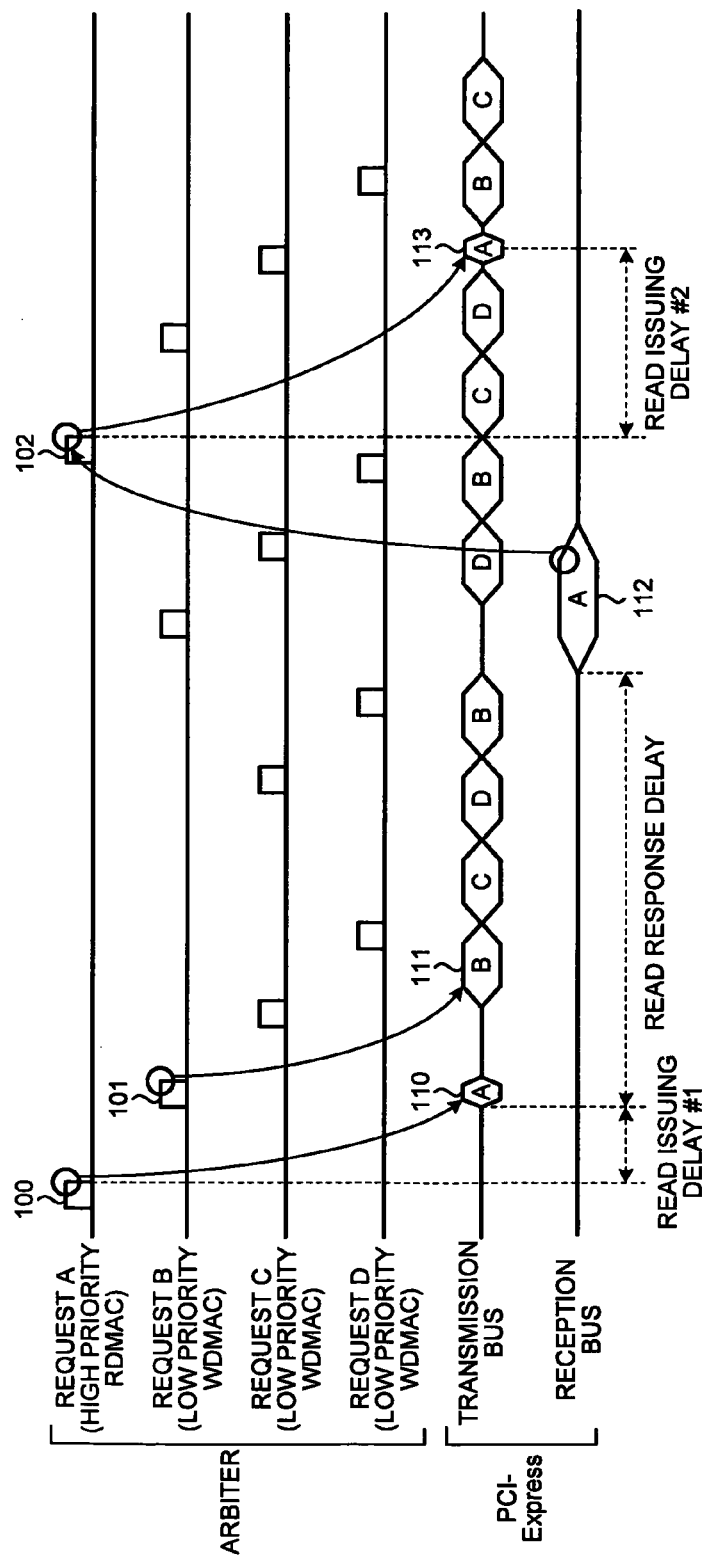
FIG. 4 is a timing diagram illustrating an example of a data transfer process in a case where any embodiment of the invention is not applied.

As illustrated in FIG. 4, a case will be considered, in which, after a read request A 100 is issued first from the high priority RDMAC, write requests B, C, and D are sequentially issued in a repeated manner from the low priority WDMACs. After the read request A 100 is issued, a write request B 101 is issued from the low priority WDMAC, and a write request packet 111 corresponding to the write request B 101 is transmitted to the transmission bus. Thereafter, write requests C and D are sequentially issued, and write requests B to D are sequentially issued further in a repeated manner. On the other hand, after the high priority RDMAC receives a read data packet 112 with a delay of the read response delay from the time of the read request A 100, the high priority RDMAC can issue a next read request A102.

Here, it is assumed that the read request A102 is issued from the high priority RDMAC slightly after issuance timing of the write request D. In such a case, after the write request packets C and D according to the write requests C and D, which are issued from the low priority WDMACs before the read request A102 and for which corresponding write request packets have not been transmitted to the transmission bus, are finished being transmitted to the transmission bus, a read request packet 113 according to the read request A102 is transmitted to the transmission bus.

Accordingly, read issuing delay #2 of the read request packet 113 to the read request A102 is longer than the above-described read issuing delay #1 by a period while transmission of a write request packet according to a write request that is received by the arbiter 231 before acceptance of the read request A102 is completed. This read issuing delay #2 is an internal delay in a state in which a write request issued from the low priority WDMAC is received before the read request A102, and a request packet other than the read request packet is transmitted in the transmission bus.

As above, in a case where a write request is issued form the low priority WDMAC in a state in which the high priority RDMAC cannot issue a read request, the read issuing delay becomes long. Accordingly, a transfer rate of a read data packet corresponding to a read request issued by the high priority RDMAC in the reception bus is lowered, whereby there is a concern that a limitation on data transfer time is not satisfied.

First Embodiment

Next, a first embodiment of the invention will be described. In the first embodiment, at least a first function to decrease a frequency of acceptance of a request of a low priority and a second function to decrease waiting time for acceptance of a request of a high priority that is caused by performing the first function are included. In addition, a third function to secure transfer of a request of a low priority that is suppressed by the first and second functions may be included therein.

The first to third functions will be briefly described. In the first function, an arbitration prohibited period during which a request from each DMAC is prohibited for a certain period of time is provided, and an arbitration prohibiting cycle is repeated which is composed of the arbitration prohibited period and an arbitration enabled period during which arbitration is enabled. The arbitration prohibited period is designated, for example, by a value stored in a register. In the second function, in addition to the first function, a request from a DMAC of a high priority is set as a non-target for which arbitration is prohibited during the arbitration prohibited period. For example, a register, in which values each used to set whether corresponding one of the DMACs is treated as the arbitration prohibition non-target is stored, is provided. The DMAC for which setting of the arbitration prohibition non-target is enabled is allowed to be subjected to arbitration even during the arbitration prohibited period. In the third function, in addition to the first and second functions, a period is designated during which the arbitration prohibiting cycle according to the first function is enabled, and the arbitration prohibiting cycle is disabled after elapse of an enabled period. This enabled period is designated, for example, by a value stored in a register.

First Function

The first function will be described in more detail. In the first function, an arbitration prohibiting function to prohibit the arbiter 231 from arbitrating requests from the DMACs 230a to 230d is used. More specifically, the arbitration prohibiting cycle enabled period including the arbitration prohibited period during which the arbiter 231 is prohibited from arbitrating the requests from the DMACs 230a to 230d for a certain period is provided. In the arbitration prohibiting cycle enabled period, the arbiter 231, after the end of the arbitration prohibited period of a predetermined time, starts the arbitration enabled period during which requests from the DMACs 230a to 230d are accepted. During the arbitration enabled period, only one request having a highest priority among the requests from the DMACs 230a to 230d, is accepted. The arbitration enabled period is continued until the request from the DMACs 230a to 230d is accepted. After the request is accepted, the arbitration prohibited period is started again.

For example, the first function can be implemented as follows. The arbiter 231 is provided with a register, in which a value designating a setting of whether the arbitration prohibiting function is enabled or disabled is stored, a register, in which a value designating the arbitration prohibited period is stored, and a register, in which a value designating the arbitration prohibiting cycle enabled period is stored. In addition, the arbiter 231 is provided with a signal terminal used to input a signal, which includes a start bit directing the arbiter 231 to start the arbitration prohibiting cycle enabled period, and a register, in which a value used to select the start bit from the signal, which is input to the signal terminal, as a trigger to start the arbitration prohibiting cycle enabled period is stored.

Figure 5:
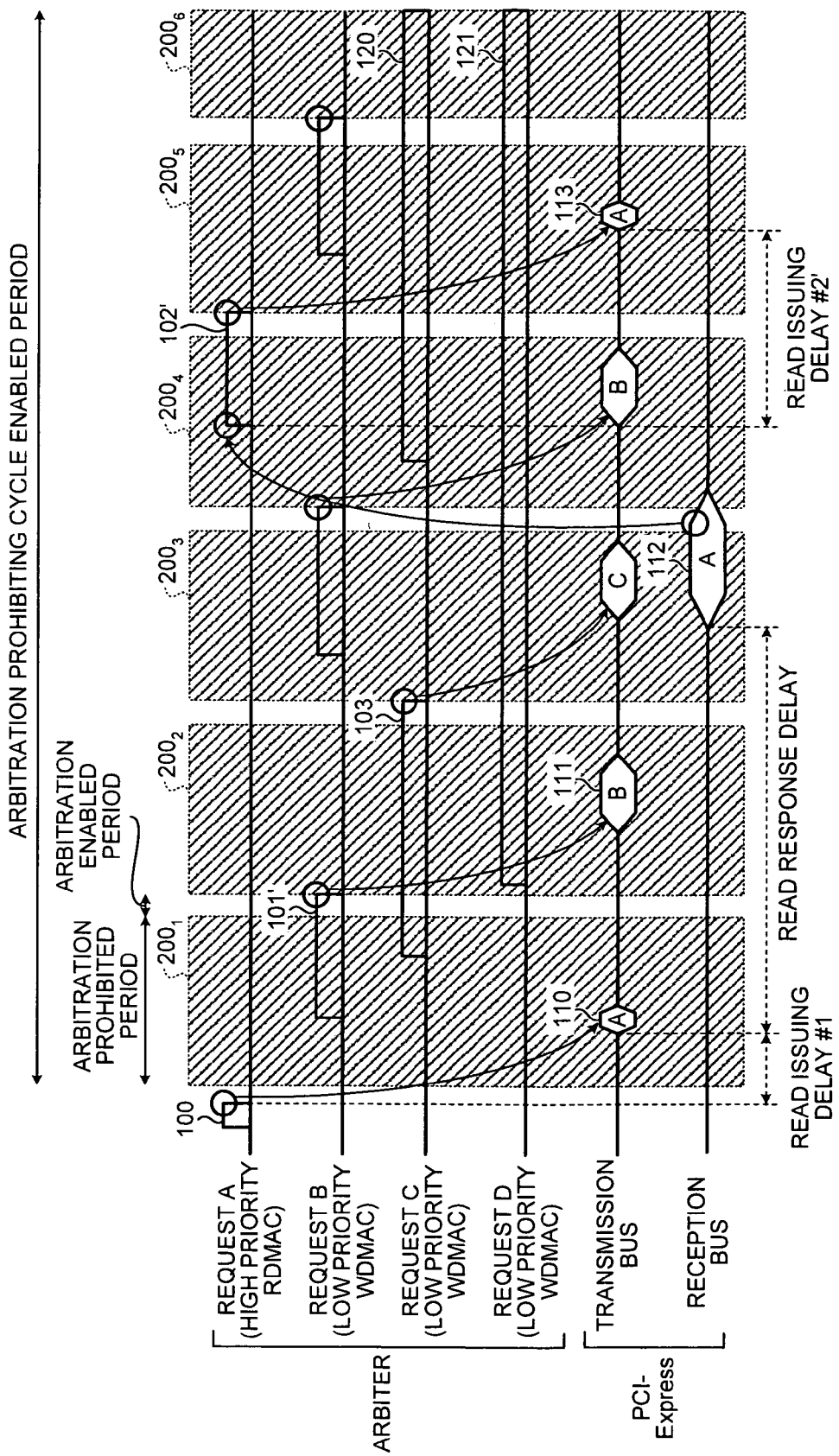
FIG. 5 is an exemplary timing diagram illustrating a first function according to a first embodiment of the invention.

FIG. 5 is an exemplary timing diagram illustrating the first function. In FIG. 5, the same reference numeral is assigned to a portion that is common to FIG. 4 described above, and detailed description thereof will not be presented here. In FIG. 5, the arbitration prohibited periods $200_1$, $200_2$, . . . are indicated by shading. Each interval between the arbitration prohibited periods $200_1$, $200_2$, . . . is the arbitration enabled period.

For example, in a case where, when the arbitration prohibited period ends and the arbitration enabled period is started, there are requests from DMACs, which have been issued during the arbitration prohibited period, the arbiter 231 accepts only one request having a highest priority among those requests. In the example illustrated in FIG. 5, in the arbitration enabled period after an end of the arbitration prohibited period $200_1$, there are a write request B 101' and a write request 103 that have been issued in the arbitration prohibited period $200_1$. The arbiter 231 accepts the write request B 101' having a highest priority among the requests. When the write request B 101' is accepted, the next arbitration prohibited period $200_2$ is started. In the arbitration enabled period, only one request is accepted, and accordingly, length of the arbitration enabled period is more than one clock.

In addition, a read request A 102' is issued in the arbitration prohibited period $200_4$ at timing depending on timing of receiving a read data packet 112. In the arbitration prohibited period $200_4$, a write request C 120 of a lower priority is issued, and the right request D 121 of a further lower priority that has been issued in the arbitration prohibited period $200_2$, remains. In the arbitration enabled period immediately after an end of the arbitration prohibited period $200_4$, the arbiter 231 accepts only the read request A 102' of a highest priority among the read request A 102', the write request C 120, and the write request D 121 and starts the next arbitration prohibited period $200_5$.

According to the first function, since the arbitration prohibited period during which requests from the DMACs 230a to 230d are not accepted by the arbiter 231 are arranged, a request of high priority can be preferentially accepted all the time, and a frequency of acceptance of a request of a low priority, is lowered. In addition, since only one request is accepted during the arbitration enabled period, consecutive transmission of write request packets according to requests of a low priority to the transmission bus as illustrated in FIG. 4 can be suppressed.

On the other hand, in the first function, a request of a high priority is allowed to be accepted only when the arbitration prohibited period of a certain period ends, and accordingly, transmission of a packet according to the request of the high priority to the transmission bus is delayed. In the example illustrated in FIG. 5, the read request packet 113 corresponding to the read request A 102' is transmitted to the transmission bus with a delay of read issuing delay #2' that is longer than the above-described read issuing delay #1 from time of issuance of the read request A102'.

Second Function

In the second function, in addition to the above-described first function, the arbitration prohibited period is ignored for a request of a high priority, and accordingly, a delay in the request of the high priority is shortened, thereby increasing throughput of the request (decreasing time of waiting for acceptance of the request). The second function can be implemented, for example, by providing a register in which values each used to set whether corresponding one of the DMACs 230a to 230d is treated as the arbitration prohibition non-target are stored.

Figure 6:
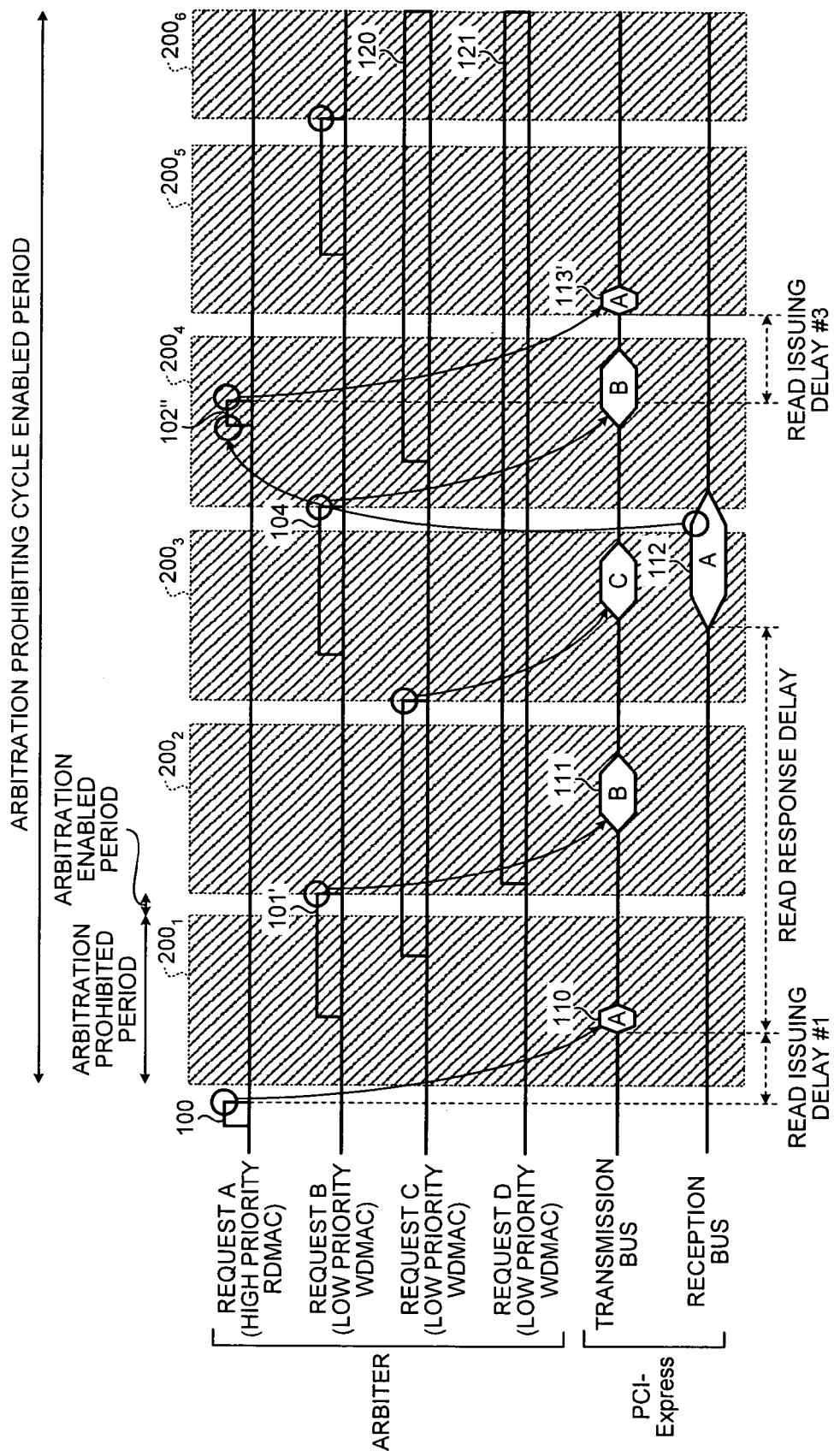
FIG. 6 is an exemplary timing diagram illustrating a second function according to the first embodiment of the invention.

FIG. 6 is an exemplary timing diagram illustrating the second function. In FIG. 6, the same reference numeral is assigned to a portion that is common to FIGS. 4 and 5 described above, and detailed description thereof will not be presented here.

In the example illustrated in FIG. 6, a read request A 102" is issued from the high priority RDMAC of the highest priority during the arbitration prohibited period $200_4$ at timing depending on timing of receiving the read data packet 112. The arbiter 231 ignores accepts the read request A 102" and transmits a read request packet 113' to the transmission bus regardless of the arbitration prohibited period $200_4$.

On the other hand, the arbiter 231 does not accept a write request C 120 that is issued during the arbitration prohibited period $200_4$ and a write request D 121 that is issued during the arbitration prohibited period $200_2$ and remains in the arbitration prohibited period $200_4$, the priorities of which are lower than that of the read request A 102", until the arbitration prohibited period $200_4$ ends. In the example illustrated in FIG. 6, in the arbitration enabled period immediately after the arbitration prohibited period $200_4$, since the read request A 102" has been already accepted by the arbiter 231, the write request C 120 and the write request D 121 are not accepted.

As above, according to the second function, the arbitration prohibited period is applied to a request of a low priority, a request of a highest priority is accepted in the arbitration enabled period, and the arbitration prohibited period is ignored to accept a request of a high priority. Accordingly, the read issuing delay of a request of a high priority is shortened, and thereby improving the transfer performance. In the example illustrated in FIG. 6, the read issuing delay #3 for the read request A 102" is approximately the same as the read issuing delay #1 for the read request A 100.

Third Function

In the above-described second function, since only one request of a low priority can be accepted for every arbitration enabled period, there is a concern that a request of a low priority is constantly suppressed and the transfer performance for the request of a low priority is degraded. Accordingly, a function to provide an arbitration prohibiting cycle disabled period that does not include the arbitration prohibited period and to start the arbitration prohibiting cycle disabled period after the arbitration prohibiting cycle enabled period is added to the above-described second function as the third function, and thereby the transfer performance for a request of a low priority can be improved.

For example, the third function, similarly to the above-described first function, can be implemented as follows. The arbiter 231 is provided with a register, in which a value designating a setting whether the arbitration prohibiting function is enabled or disabled is stored, a register, in which a value designating an arbitration prohibited period is stored, and a register, in which a value designating an arbitration prohibiting cycle enabled period is stored. In addition, the arbiter 231 is provided with a signal terminal used to input a signal, which includes a start bit directing the arbiter 231 to start the arbitration prohibiting cycle enabled period, and a register, in which a value used to select the start bit from the signal, which is input to the signal terminal, as a trigger to start the arbitration prohibiting cycle enabled period is stored.

Figure 7:
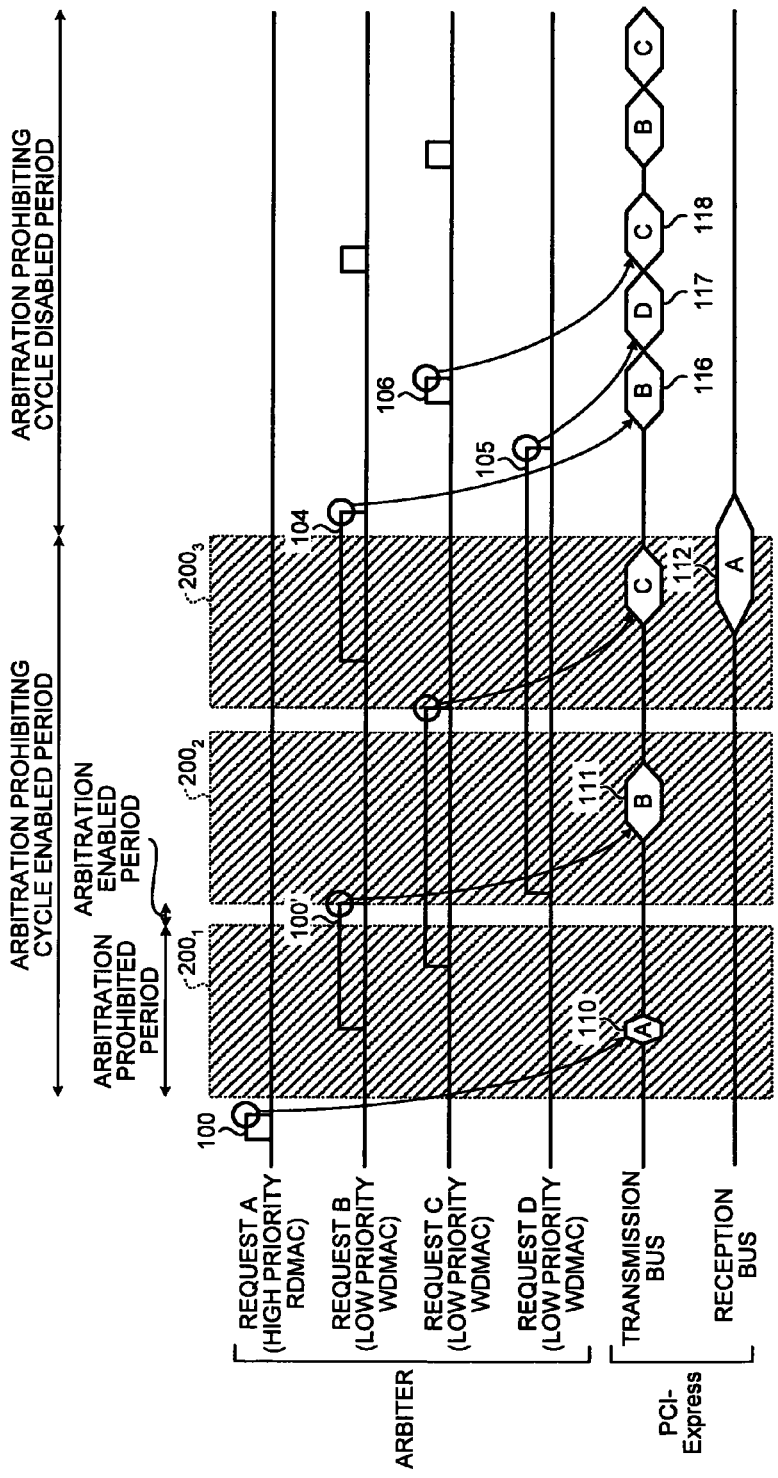
FIG. 7 is an exemplary timing diagram illustrating a third function according to the first embodiment of the invention.

FIG. 7 is an exemplary timing diagram illustrating the third function. In FIG. 7, the same reference numeral is assigned to a portion that is common to FIGS. 4 to 6 described above, and detailed description thereof will not be presented here. In the example illustrated in FIG. 7, the arbitration prohibiting cycle enabled period ends together with an end of the arbitration prohibited period 200$_3$, and an arbitration prohibiting cycle disabled period is started.

In the arbitration prohibiting cycle disabled period, the arbiter 231 sequentially accepts requests from the DMACs 230a to 230d in accordance with the priorities and an order of issuance. In the example illustrated in FIG. 7, when the arbitration prohibiting cycle disabled period is started, a write request B 104 and a write request D 105 that remain at a time of start of the arbitration prohibiting cycle disabled period are sequentially accepted by the arbiter 231 in accordance with the priorities, and a newly-issued write request C 106 is accepted by the arbiter 231. Then, write data packets 116, 117, and 118 corresponding to the write requests B 104, D 105, and C 106 are sequentially transmitted to the transmission bus.

As above, according to the third function, since a period in which issuance for a request of a low priority is suppressed is limited up to immediately prior to the arbitration prohibiting cycle disabled period, the transfer performance can be improved.

Details of Arbiter

Figure 8:
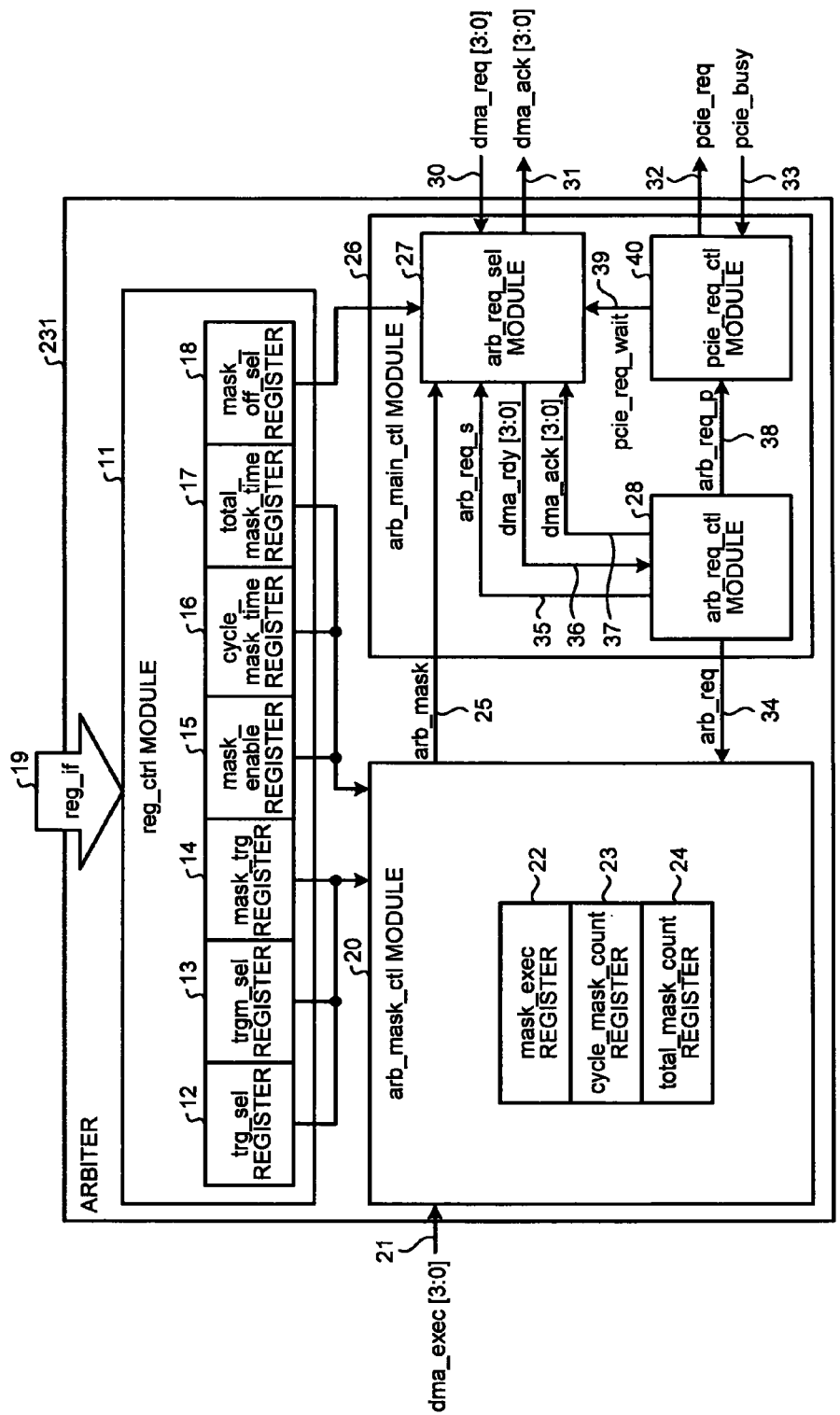
FIG. 8 is a block diagram illustrating the configuration of an example of an arbiter according to the first embodiment of the invention.

Next, the configuration and the operation of the arbiter 231 to realize the above-described first to third functions will be described in detail with reference to FIGS. 8 to 16. FIG. 8 illustrates the configuration of an example of the arbiter 231 according to the first embodiment.

In the arbiter 231, a reg_ctrl module 11 is a module that controls access to registers 12 to 18 included inside the arbiter 231 from an outside of the arbiter 231. In addition, a trg_sel register 12 is a register that is used to select a trigger to start the arbitration prohibiting cycle. The following items can be selected as the trigger to start the arbitration prohibiting cycle.

(1) The value of the mask_trg register 14 becomes "1."
(2) A bit selected by the trgm_sel register 13 among bits, which are four bits in all, of a signal dma_exec 21 is asserted.

A trgm_sel register 13 is a register that is used to select the bit of the four bits of the signal dma_exec 21, assertion of which is used as the trigger to start the arbitration prohibiting cycle in a case where it is set by the trg_sel register 12 that start of the arbitration prohibiting cycle is triggered when "(2) a bit of the signal dma_exec 21 is asserted". A plurality of bits of the signal dma_exec 21 can be selected as a trigger to start the arbitration prohibiting cycle, and, in such a case, assertion of any of the selected bits triggers the arbitration prohibiting cycle.

The mask_trg register 14 acts as a trigger to start the arbitration prohibiting cycle when a value "1" is written in the mask_trg register 14 in a case where it is set by the trg_sel register 12 that start of the arbitration prohibiting cycle is triggered when "(1) the value of the mask_trg register 14 becomes "1"."

A mask_enable register 15 is a register that is used to enable/disable the arbitration prohibiting function. A cycle_mask_time register 16 is a register that is used to set length of the arbitration prohibited period. A total_mask_time register 17 is a register that is used to set length of the arbitration prohibiting cycle enabled period. A mask_off_sel register 18 is a register that is used to select whether each of the DMACs is treated as the arbitration prohibiting non-target.

An interface reg_if 19 is an interface used to access the registers included inside the arbiter 231 from the outside of the arbiter 231.

An arb_mask_ctl module 20 controls the arbitration prohibiting cycle based on values of the registers 12 to 17 and inputs of the signal dma_exec 21 and a signal arb_req 34. The arb_mask_ctl module 20 asserts a signal arb_mask 25 during the arbitration prohibited period.

The signal dma_exec 21 is a signal that is output to the DMACs 230a to 230d and indicates that the DMACs 230a to 230d are activated. Here, for convenience of the description, it is assumed that the signals for the DMACs 230a to 230d are assigned to bits 0 to 3 of the signal dma_exec 21.

The arb_mask_ctl module 20 includes, as internal registers, a mask_exec register 22, a cycle_mask_count register 23, and a total_mask_count register 24. In the mask_exec register 22, a signal indicating that it is in the adjustment prohibiting cycle enabled period is written. In the cycle_mask_count register 23, a counting value of the arbitration prohibited period is stored. In the total_mask_count register 24, a counting value of the arbitration prohibiting cycle enabled period is stored.

The signal arb_mask 25 is a signal that is output from the arb_mask_ctl module 20 to an arb_main_ctl module 26 and indicates that it is in the adjustment prohibiting period.

The arb_main_ctl module 26 includes an arb_req_sel module 27, an arb_req_ctl module 28, and a pcie_req_ctl module 40 as internal modules and arbitrates data transfer requests from the DMACs 230a to 230d based on information of the mask_off_sel register 18, a signal dma_req 30, the signal arb_mask 25, and a signal pcie_busy 33.

The arb_req_sel module 27 selects requests as targets to be arbitrated (arbitration prohibiting non-targets) from the signal dma_req 30 based on values of the mask_off_sel register 18 and the signal arb_mask 25. The arb_req_ctl module 28 arbitrates the requests selected as the targets to be arbitrated. In a case where, the arb_req_ctl module 28 asserts the signal arb_req 34 when a request to be accepted is determined.

The signal dma_req 30 is a signal that is output from the DMACs 230a to 230d and represents data transfer requests of the DMACs 230a to 230d. Here, for convenience of the description, it is assumed that the signals of the DMACs 230a to 230d are assigned to 0th bit to 3rd bit of the signal dma_req 30.

A signal dma_ack 31 is output from the arb_main_ctl module 26 and represents whether the data transfer requests of the DMACs 230a to 230d is accepted. A signal pcie_req 32 is output from the arb_main_ctl module 26 to the PCIe I/F 232 and is a signal to request to issue a data transfer packet. The signal pcie_busy 33 is a signal that is output from the PCIe I/F 232 and represents a packet request acceptance status.

The signal arb_req 34 is output from the arb_main_ctl module 26 to the arb_mask_ctl module 20 and represents a request arbitration result. A signal arb_req_s 35 is output from the arb_req_ctl module 28 to the arb_req_sel module 27 and represents the same value as that of the signal arb_req 34. A signal dma_rdy 36 is output from the arb_req_sel module 27 to the arb_req_ctl module 28 and represents requests that are set as the targets to be arbitrated. In a case where a request of the DMAC 230a is accepted, 0th bit of the signal dma_rdy 36 is asserted.

A signal dma_ack 37 is output from the arb_req_ctl module 28 to the arb_req_sel module 27 and represents whether the requests set as the targets to be arbitrated is accepted. A signal arb_req_p 38 is output from the arb_req_ctl module 28 to the pcie_req_ctl module 40 and represents the same value as that of the signal arb_req 34. A signal pcie_req_wait 39 is output from the pcie_req_ctl module 40 to the arb_req_sel module 27 and represents whether to wait request to the PCIe I/F 232.

The pcie_req_ctl module 40 controls a request to issue a packet to the PCIe I/F 232 based on a value of the signal arb_req_p 38.

An example of a control process of the arbitration prohibited period in the arbiter 231 according to the first embodiment will be described with reference to FIGS. 9 to 16. First, an example of the operation of the arb_mask_ctl module 20 will be described with reference to FIGS. 9 to 12.

Figure 9:
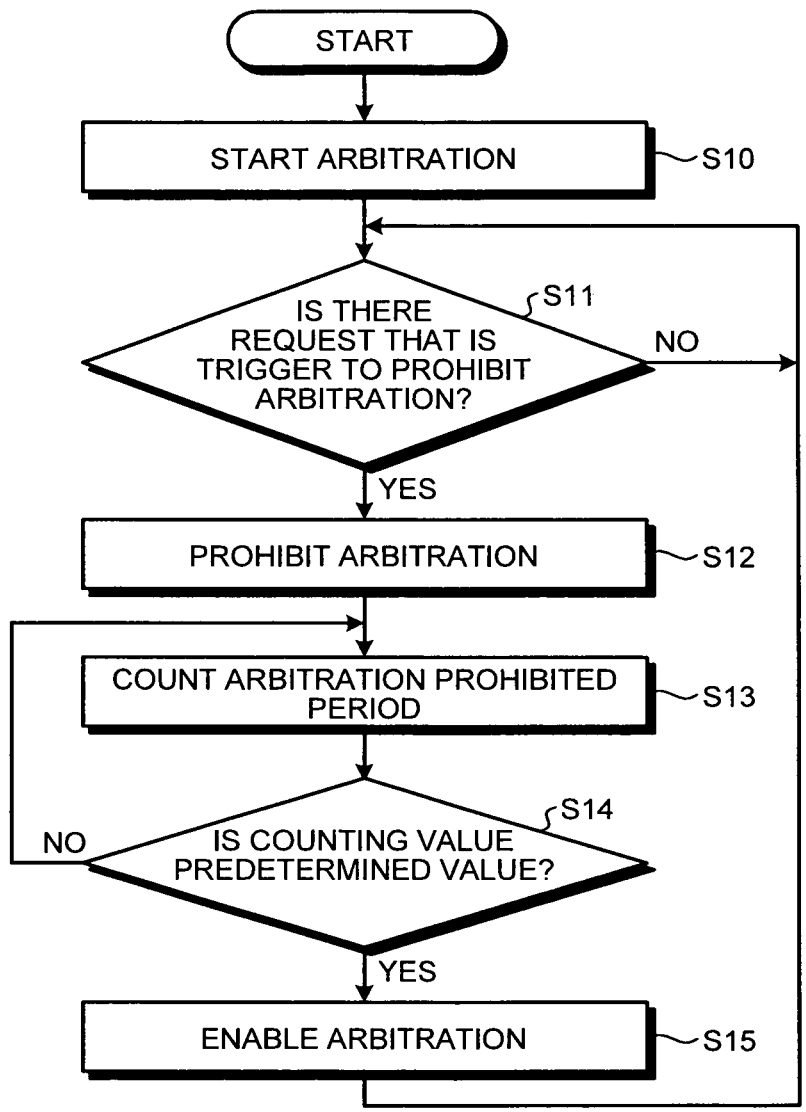
FIG. 9 is an exemplary flowchart illustrating an overview of operation of an arb_mask_ctl module.

FIG. 9 is an exemplary flowchart illustrating an overview of operation of the arb_mask_ctl module 20. When an arbitration process performed by the arbiter 231 is started in Step S10, the arb_mask_ctl module 20 waits for a request that is a trigger to start the arbitration prohibited period in Step S11. When the request that triggers the start is received, the arb_mask_ctl module 20 starts the arbitration prohibited period, and thereby prohibiting the arbitration of requests from the DMACs 230a to 230d in Step S12. Then, in next Step S13, counting of the arbitration prohibited period is started. It is determined whether or not the counting value reaches a predetermined value in Step S14, and, when the counting value reaches the predetermined value, the arb_mask_ctl module 20 ends the arbitration prohibited period and enables the arbitration of the requests from the DMACs 230a to 230d in Step S15. Then, the process returns to Step S11, and a trigger to start the next arbitration prohibited period is waited.

Figure 10:
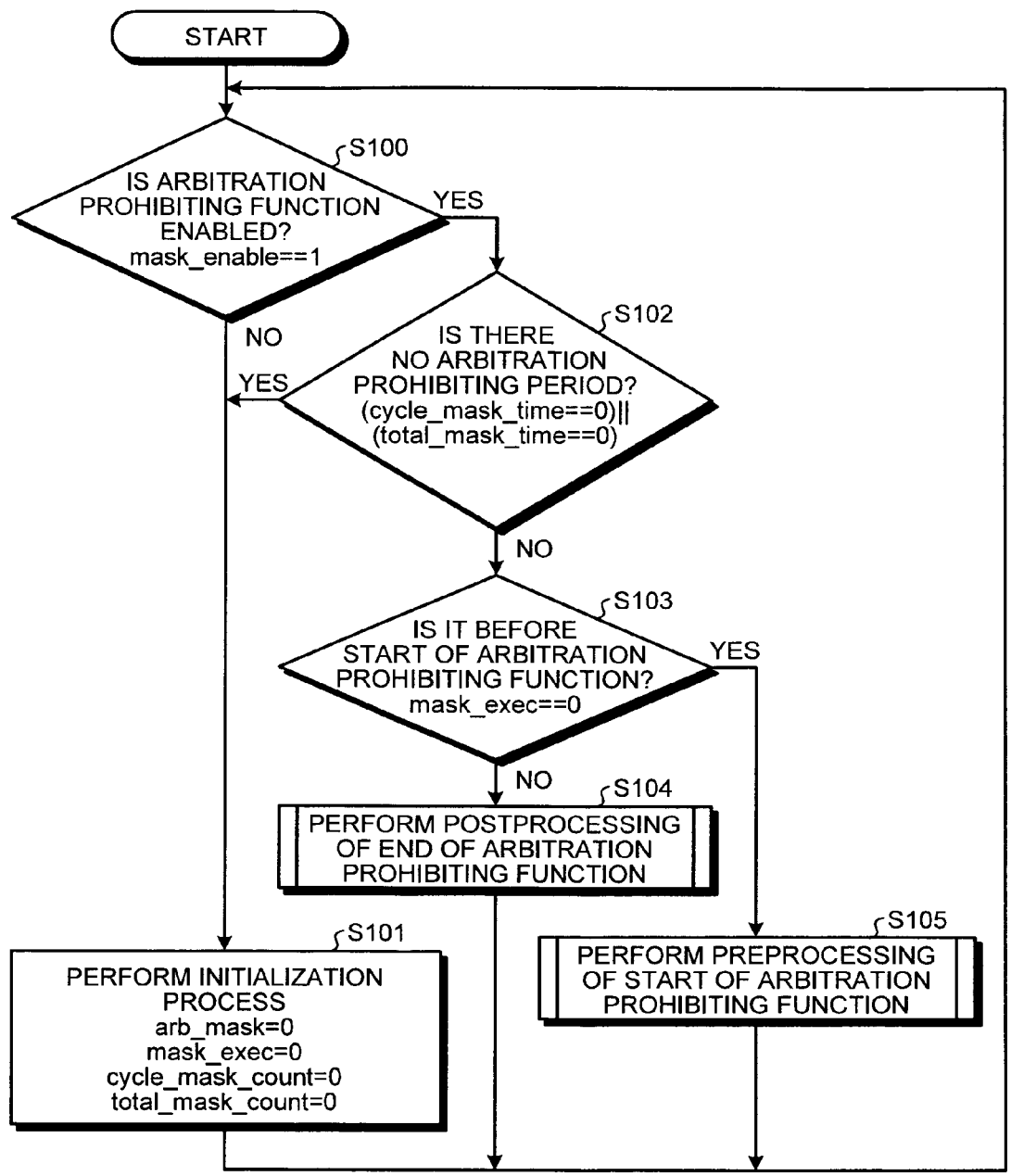
FIG. 10 is an exemplary flowchart illustrating the operation of the arb_mask_ctl module in more detail.

FIG. 10 is an exemplary flowchart illustrating the operation of the arb_mask_ctl module 20 in detail. In the flowcharts mentioned below, operators are assumed to follow C language notations. For example, an operator "==" represents equality, and an operator "!=" represents inequality. When the arbitration process is started, the arb_mask_ctl module 20 determines whether or not the arbitration prohibiting function is enabled in Step S100. More specifically, the arb_mask_ctl module 20 refers to the mask_enable register 15 and determines that the arbitration prohibiting function is enabled in a case where the stored value is "1" and determines that the arbitration prohibiting function is disabled in a case where the stored value is "0."

In a case where the value of the mask_enable register 15 is "0," and the arbitration prohibiting function is determined to be disabled, the arb_mask_ctl module 20 proceeds to Step S101 to perform an initialization process. In the initialization process, the value of the signal arb_mask 25 is changed to "0," and a value "0" is respectively stored in the mask_exec register 22, the cycle_mask_count register 23, and the total_mask_count register 24. After the initialization process is completed, the arb_mask_ctl module 20 returns to Step S100.

On the other hand, in a case where the value of the mask_enable register 15 is "1," and the arbitration prohibiting function is determined to be enabled in Step S100, the arb_mask_ctl module 20 proceeds to Step S102. In Step S102, the arb_mask_ctl module 20 determines whether or not there is the arbitration prohibited period. More specifically, in a case where the value of the cycle_mask_time register 16 is "0" or the value of the total_mask_time register 17 is "0," the arb_mask_ctl module 20 determines that there is no arbitration prohibited period and proceeds to Step S101. On the other hand, in a case where the value of the cycle_mask_time register 16 is other than "0," and the value of the total_mask_time register 17 is other than "0," the arb_mask_ctl module 20 determines that there is the arbitration prohibited period, and proceeds to Step S103.

In Step S103, the arb_mask_ctl module 20 determines whether or not it is before the start of the arbitration prohibiting function. In other words, in Step S103, it is determined whether or not the arbitration prohibiting function has been started at present. More specifically, in a case where the value stored in the mask_exec register 22 is "0," the arb_mask_ctl module 20 determines that the arbitration prohibiting function has not been started at present, in other words, determines that it is before the start of the arbitration prohibiting function, so that the arb_mask_ctl module 20 proceeds to Step S105 to perform pre-start processing of the arbitration prohibiting function. On the other hand, in a case where the value stored in the mask_exec register 22 is other than "0," the arb_mask_ctl module 20 determines that the arbitration prohibiting function has been started at present, so that the arb_mask_ctl module 20 proceeds to Step S104 to perform post-start processing of the arbitration prohibiting function. When the process of Step S104 or S105 is completed, the arb_mask_ctl module 20 returns to Step S100.

Figure 11:
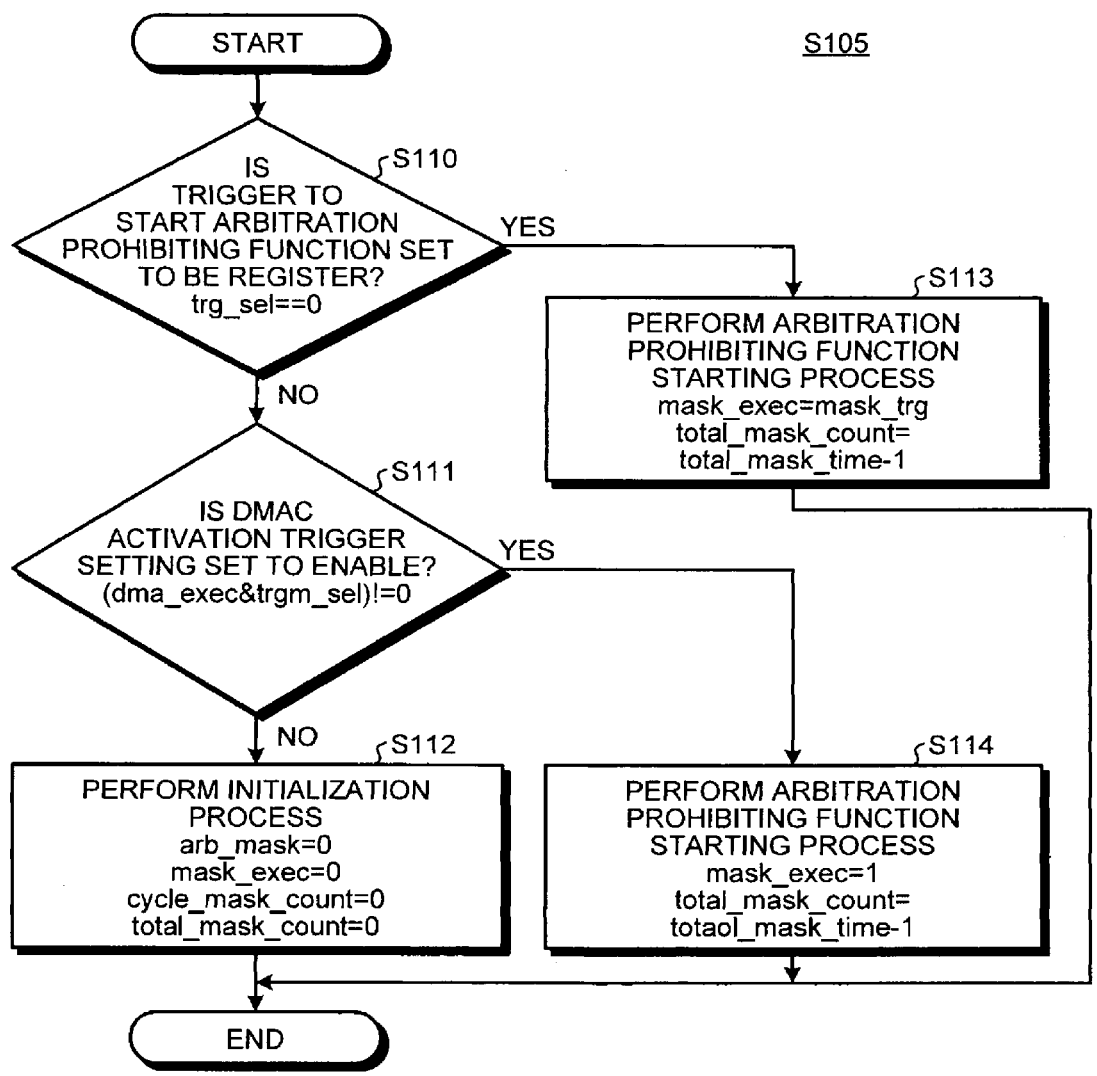
FIG. 11 is an exemplary flowchart illustrating pre-start processing of an arbitration prohibiting function.

FIG. 11 is an exemplary flowchart illustrating the pre-start processing of the arbitration prohibiting function in Step S105 illustrated in FIG. 10. When the pre-start processing of the arbitration prohibiting function is started, in Step S110, the arb_mask_ctl module 20 determines whether or not "the value of the mask_trg register 14 is "1"" is set as the trigger to start the arbitration prohibiting function. More specifically, the arb_mask_ctl module 20 determines that change of the value of the mask_trg register 14 to "1" is assigned to the trigger to start the arbitration prohibiting function in a case where the value of the trg_sel register 12 is "0" and proceeds to Step S113

In Step S113, the arb_mask_ctl module 20 performs an arbitration prohibiting function starting process. More specifically, the arb_mask_ctl module 20 writes the value of the mask_trg register 14 into the mask_exec register 22 and writes a value obtained by subtracting "1" from the value of the total_mask_time register 17 into the total_mask_count register 24. Then, a series of processes according to the flowchart illustrated in FIG. 11 is completed, and the process returns to Step S100 illustrated in FIG. 10.

On the other hand, in a case where the value of the trg_sel register 12 is not "0," and change of the value of the mask_trg register 14 to "1" is determined not to be assigned to the trigger to start the arbitration prohibiting function in Step S110, the arb_mask_ctl module 20 proceeds to Step S111. Then, in Step S111, the arb_mask_ctl module 20 determines whether or not a DMAC activation trigger setting is set to enable. More specifically, in a case where the result of bitwise AND of the value of the signal dma_exec 21 and the value of the trgm_sel register 13 is not "0," the arb_mask_ctl module 20 determines that the the DMAC activation trigger setting is set to enable and proceeds to Step S114.

In Step S114, the arb_mask_ctl module 20 performs the arbitration prohibiting function starting process. More specifically, the arb_mask_ctl module 20 sets the value of the mask_exec register 22 to "1" and writes a value obtained by subtracting "1" from the value of the total_mask_time register 17 into the total_mask_count register 24. Then, a series of processes according to the flowchart illustrated in FIG. 11 is completed, and the process returns to Step S100 illustrated in FIG. 10.

On the other hand, in a case where the result of bitwise AND of the value of the signal dma_exec 21 and the value of the trgm_sel register 13 is "0" in Step S111, the arb_mask_ctl module 20 determines that the DMAC activation trigger setting is set to disable, so that the arb_mask_ctl module 20 proceeds to Step S112 to perform an initialization process. In the initialization process, the value of the signal arb_mask 25 is set to "0," and a value "0" is respectively stored in the mask_exec register 22, the cycle_mask_count register 23, and the total_mask_count register 24. Through this initialization process, the arbitration prohibiting cycle disabled period is started. When the initialization process ends, a series of processes according to the flowchart illustrated in FIG. 11 is completed, and the process returns to Step S100 illustrated in FIG. 10.

Figure 12:
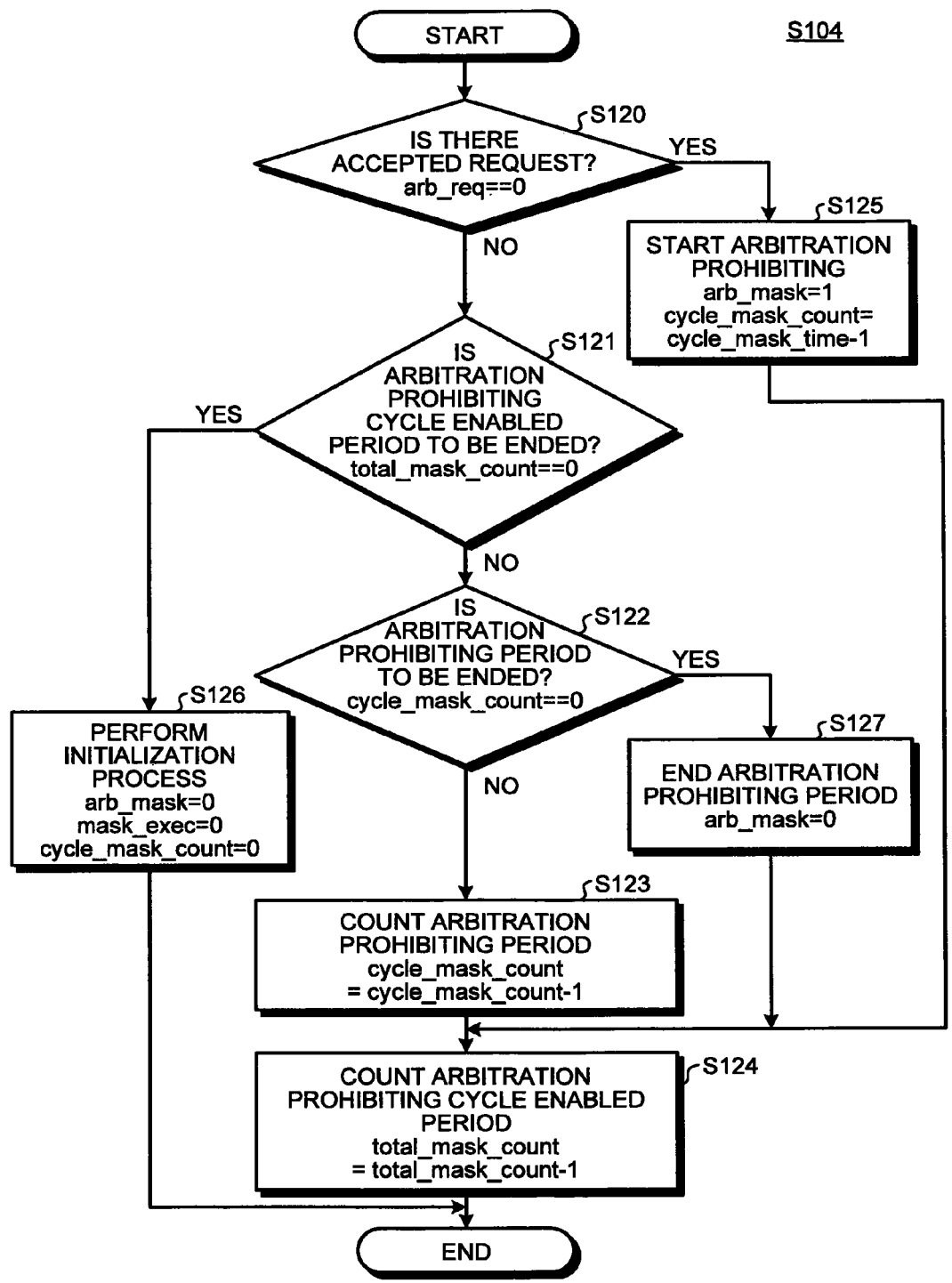
FIG. 12 is an exemplary flowchart illustrating post-start processing of the arbitration prohibiting function.

FIG. 12 is an exemplary flowchart illustrating the post-start processing of the arbitration prohibiting function in Step S104 illustrated in FIG. 10. When the post-start processing of the arbitration prohibiting function is started, in Step S120, the arb_mask_ctl module 20 determines whether or not a request as the target to be arbitrated has been accepted from the DMACs 230a to 230d. More specifically, the arb_mask_ctl module 20 determines whether or not the value of the signal arb_req 34 is "0," and, in a case where the value is other than "0," determines that there is an accepted request, so that the arb_mask_ctl module 20 proceeds to Step S125.

In Step S125, the arb_mask_ctl module 20 starts the arbitration prohibited period. More specifically, the arb_mask_ctl module 20 sets the value of the signal arb_mask 25 to "1" and sets the value of the cycle_mask_count register 23 to a value obtained by subtracting "1" from the value of the cycle_mask_time register 16. When the arbitration prohibited period is started, the process proceeds to Step S124, and counting of an arbitration prohibiting cycle enabled period is performed. More specifically, a new value of the total_mask_count register 24 is set to a value obtained by subtracting "1" from the value of the total_mask_count register 24. Then, a series of processes according to the flowchart illustrated in FIG. 12 is completed, and the process returns to Step S100 illustrated in FIG. 10.

On the other hand, in a case where the value of the signal arb_req 34 is "0," and it is determined that there is no accepted request in Step S120, the arb_mask_ctl module 20 proceeds to Step S121. In Step S121, the arb_mask_ctl module 20 determines whether or not the arbitration prohibiting cycle enabled period ends. More specifically, in a case where the value of the total_mask_count register 24 is "0," the arb_mask_ctl module 20 determines that the arbitration prohibiting cycle enabled period ends and proceeds to Step S126.

In Step S126, the arb_mask_ctl module 20 performs an initialization process. More specifically, the arb_mask_ctl module 20 sets the values of the signal arb_mask 25, the mask_exec register 22, and the cycle_mask_count register 23 to "0". Thereby, the arbitration enabled period is started, and the arb_mask_ctl module 20 permits the arb_main_ctl module 26 to arbitrate data transfer requests from the DMACs 230a to 230d. Then, a series of processes according to the flowchart illustrated in FIG. 12 is completed, and the process returns to Step S100 illustrated in FIG. 10.

On the other hand, in a case where the value of the total_mask_count register 24 is not "0," and the arbitration prohibiting cycle enabled period is determined not to end in Step S121, the arb_mask_ctl module 20 proceeds to Step S122. In Step S122, it is determined whether or not the arbitration prohibited period ends. More specifically, in a case where the value of the cycle_mask_count register 23 is "0," the arb_mask_ctl module 20 determines that the arbitration prohibited period ends and proceeds to Step S127. In Step S127, the arb_mask_ctl module 20 sets the value of the signal arb_mask 25 to "0" and ends the arbitration prohibited period. Then, the arb_mask_ctl module 20 proceeds to the above-described Step S124.

In a case where the value of the cycle_mask_count register 23 is not "0," and the arbitration prohibited period is determined not to end in Step S122, the arb_mask_ctl module 20 proceeds to Step S123 and performs counting of the arbitration prohibited period. More specifically, a new value of the cycle_mask_count register 23 is set to a value obtained by subtracting "1" from the cycle_mask_count register 23. Then, the process proceeds to the above-described Step S124.

Figure 13:
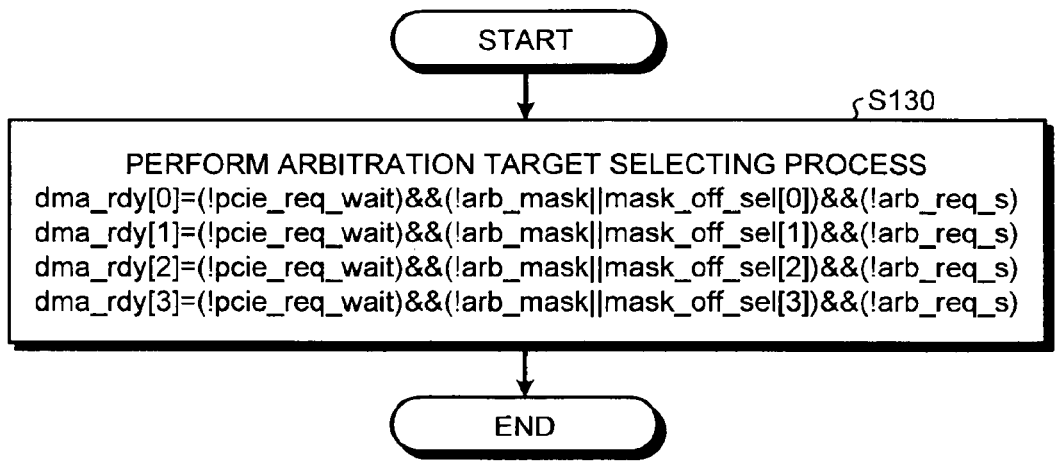
FIG. 13 is an exemplary flowchart illustrating operation of an arb_req_sel module.
Figure 14:
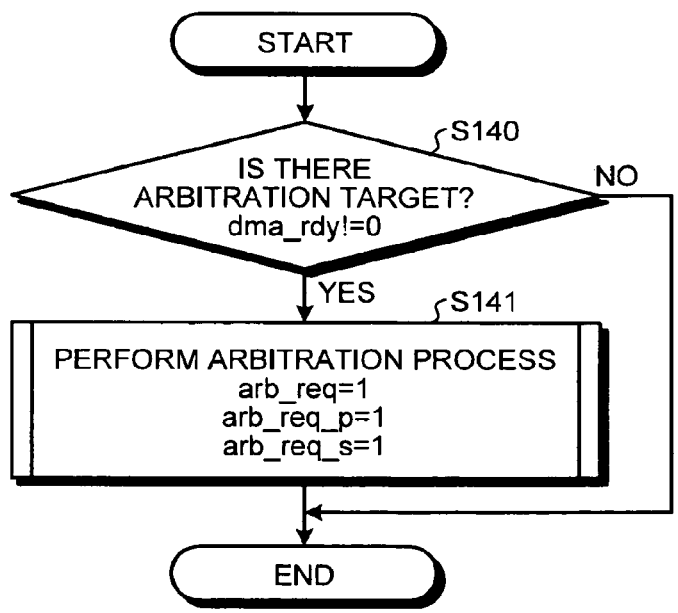
FIG. 14 is an exemplary flowchart illustrating operation of an arb_req_ctl module.
Figure 15:
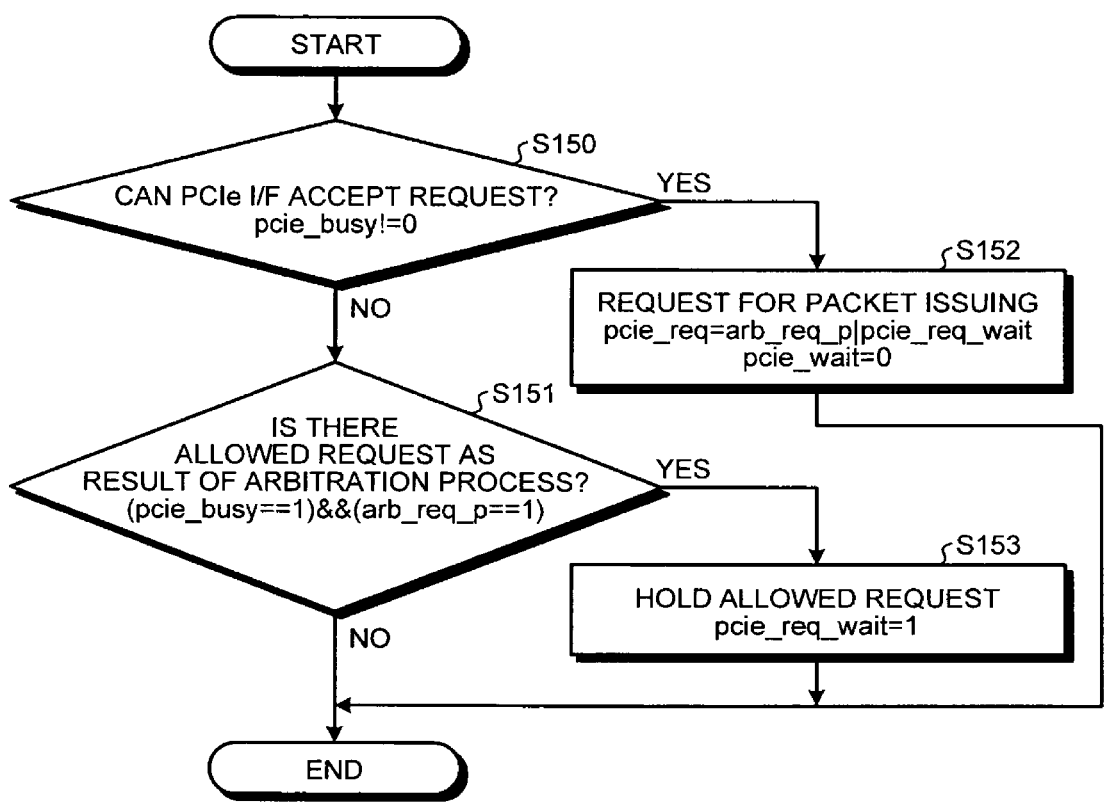
FIG. 15 is an exemplary flowchart illustrating operation of a pcie_req_ctl module.

Next, operation of the arb_main_ctl module 26 will be descried with reference to FIGS. 13 to 15. The arb_main_ctl module 26, as described above, arbitrates the data transfer requests from the DMACs 230a to 230d. By enabling/disabling (prohibiting) arbitration operation of the arb_main_ctl module 26 in accordance with the above-described signal arb_mask 25 transmitted from the arb_mask_ctl module 20, the arbitration prohibited period and the arbitration enabled period are realized.

FIG. 13 is an exemplary flowchart illustrating operation of an arb_req_sel module 27 that is included in the arb_main_ctl module 26. The arb_req_sel module 27 selects the target to be arbitrated by the arbiter 231 from the DMACs 230a to 230d in Step S130.

In this example in which the arbiter 231 arbitrates the requests from four DMACs 230a to 230d, each bit of four-bit signal dma_rdy[3:0] denotes corresponding one of DMACs 230a to 230d. That is, for each bit of the four bits of the signal dma_rdy[3:0], it is denoted that a request from the DMAC, the value of the bit corresponding to which is "1", is the target to be arbitrated. Here, the signal dma_rdy[0] that is 0th bit denotes an DMAC of a highest priority, and a signal dma_rdy[3] that is 3rd bit denotes a DMAC of a lowest priority.

The arb_req_sel module 27 selects the target to be arbitrated by the arbiter 231 based on the signal mask_off_sel[3:0] of four bits stored in the mask_off_sel register 18 and each corresponding to one of the DMACs 230a to 230d, the signal pcie_req_wait 39, the signal arb_mask 25, and the signal arb_req_s35.

More specifically, a logical product of a logical sum of the signal mask_off_sel[3:0] and a negated value of the signal arb_mask 25, a negated value of the signal pcie_req_wait 39, and a negative value of the signal arb_req_s35 is calculated for each bit of the signal dma_rdy[3:0] and is assigned to the value of each bit of the signal dma_rdy[3:0].

FIG. 14 is an exemplary flowchart illustrating operation of the arb_req_ctl module 28 included in the arb_main_ctl module 26. First, in Step S140, it is determined whether there is the DMAC that is the target to be arbitrated. More specifically, the arb_req_ctl module 28 determines that there are one or more DMACs that is the target to be arbitrated in a case where the value of the signal dma_rdy[3:0] is not "0." On the other hand, in a case where the value of the signal dma_rdy [3:0] is "0," and the DMAC that is the target to be arbitrated is determined not to be present, a series of processes according to the flowchart illustrated in FIG. 14 is completed.

On the other hand, in a case where the value of the signal dma_rdy[3:0] is not "0," and one or more DMACs that is the target to be arbitrated are determined to be present, the arb_req_ctl module 28 proceeds to Step S141. In Step S141, the arb_req_ctl module 28 performs an arbitration process for the DMACs that are the targets to be arbitrated so as to determine a request that is allowed to be accepted by the arbiter 231. More specifically, the values of the signal arb_req 34, the signal arb_req_p 38, and the signal arb_req_s 35 are set to "1." This arbitration operation is sequentially performed for each of the DMACs 230a to 230d based on the priorities determined in advance.

FIG. 15 is an exemplary flowchart illustrating operation of the pcie_req_ctl module 40 included in the arb_main_ctl module 26. First, in Step S150, the pcie_req_ctl module 40 determines whether or not a state in which the PCIe I/F 232 can accept a request is reached. More specifically, in a case where the value of the signal pcie_busy 33 is not "1," it is determined that the sate in which the PCIe I/F 232 can accept is reached, and the process proceeds to Step S152.

In Step S152, the pcie_req_ctl module 40 transmits a packet issuing request to the bus 223. More specifically, a bitwise OR of the signal arb_req_p 38 and the signal pcie_req_wait 39 is assigned to the signal pcie_req 32 and is transmitted to the bus 223. In conjunction with this, the value of the signal pcie_req_wait 39 is set to "0." Then, a series of processes according to the flowchart illustrated in FIG. 15 is completed.

On the other hand, in Step S150, in a case where the value of the signal pcie_busy 33 is "1," and it is determined that a state in which the PCIe I/F 232 can accept a request is not reached, the pcie_req_ctl module 40 proceeds to Step S151. In Step S151, the pcie_req_ctl module 40 determines whether or not a request allowed to be accepted is determined by the arb_req_ctl module 28 as a result of the arbitration process. More specifically, in a case where the value of the signal pcie_busy 33 is "1," and the value of the signal arb_req_p 38 is "1," it is determined that a request allowed to be accepted is determined, and the process proceeds to Step S153.

In Step S153, the pcie_req_ctl module 40 temporarily holds the request allowed to be accepted, which is determined by the arb_req_ctl module 28, and sets the value of the signal pcie_req_wait 39 to "1." Then, a series of processes according to the flowchart illustrated in FIG. 15 is completed.

Figure 16:
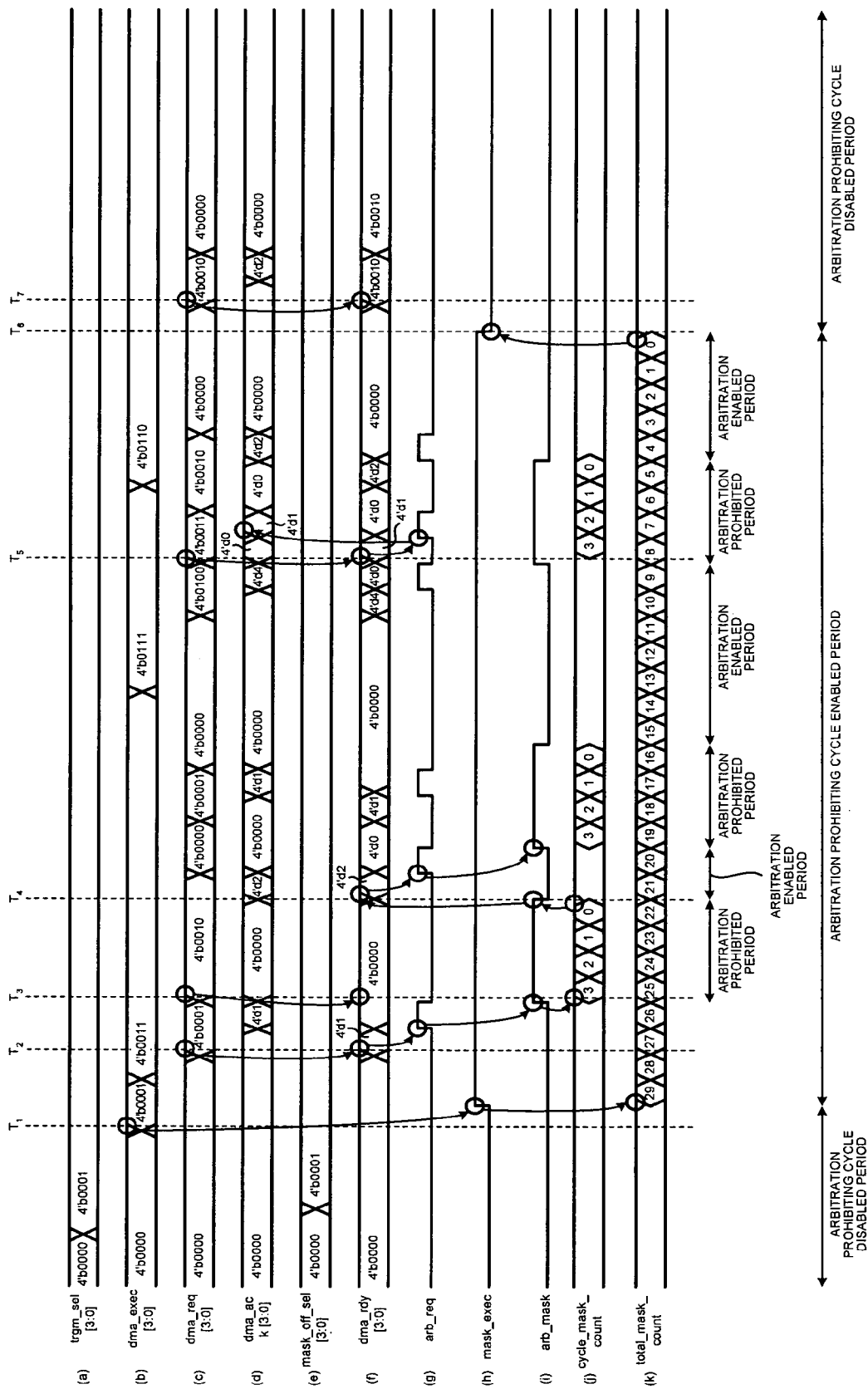
FIG. 16 is an exemplary timing diagram of internal signals an arbiter according to the first embodiment of the invention when the arbiter operates.

FIG. 16 is an exemplary timing diagram of internal signals of the arbiter 231 that operates according to the flowcharts illustrated in FIGS. 9 to 15 described above. Here, the values of the registers 12 to 18 are assumed to be set as follows. The value of the mask_enable register 15 is set to "1" so that the arbitration prohibiting function is set to be enabled. The value of the cycle_mask_time register 16 is set to "4," and the value of the total_mask_time register 17 is set to "30," to set length of the arbitration prohibited period and length of the arbitration prohibiting cycle enabled period. In addition, the value of the trg_sel register 12 is set to "1" so that the DMAC activation trigger is set as the trigger to start the arbitration prohibiting cycle.

Incidentally, FIGS. 16(a), 16(e), 16(h), 16(j), and 16(k) illustrate the values of the trgm_sel register 13, the mask_off_sel register 18, the mask_exec register 22, the cycle_mask_count register 23, and the total_mask_count register 24, respectively. Among these values, each of the values of the trgm_sel register 13 and the mask_off_sel register 18 is four-bit value. In the figure, the notation of "4'b" represents that a value following that notation is a 4-bit value represented in a binary notation, and "4'd" represents that a value following that notation is a 4-bit value represented in a decimal notation.

In addition, FIGS. 16(b), 16(c), 16(d), 16(f), 16(g), and 16(i) represent the values of the signal dma_exec 21, the signal dma_req 30, the signal dma_ack 31, the signal dma_rdy 36, the signal arb_req 34, and the signal arb_mask 25. Among these values, each of the signal dma_exec 21, the signal dma_req 30, the signal dma_ack 31, and the signal dma_rdy 36 is a 4-bit value.

When operation is started, the value of 0th bit of the trgm_sel register 13 is changed to "1" so that a request from the DMAC 230a is set as the activation trigger. In addition, the value of 0th bit of the mask_off_sel register 18 is changed to "1" so that the request from the DMAC 230a is set as the arbitration prohibiting non-target (See FIGS. 16(a) and 16(e)). Thereafter, until a request from the DMAC 230a is issued at time $T_1$, the process proceeds to Step S105 through Steps S100, S102, and S103 illustrated in FIG. 10 so that the pre-start processing of the arbitration prohibiting function is performed. In addition, in the pre-start processing of the arbitration prohibiting function, the process returns to Step S100 illustrated in FIG. 10 through Steps S110, S111, and S112 illustrated in FIG. 11.

At time $T_1$, the DMAC 230a that is the high priority RDMAC having a highest priority is activated so that the value of 0th bit of the signal dma_exec 21 is changed to "1" (see FIG. 16(b)). Accordingly, in the pre-start processing of the arbitration prohibiting function illustrated in FIG. 11, the process proceeds to Step S114 from Step S111 so that a value obtained by subtracting "1" from the value of the total_mask_time register 17 is written into the total_mask_count register 24, and the value of the mask_exec register 22 is set to "1" to start the arbitration prohibiting cycle enabled period (see FIG. 16(h)). From this, after the process gets away from the flowchart illustrated in FIG. 11 to return to Step S100 illustrated in FIG. 10, the process proceeds from Step S103 to Step S104, and the post-start processing of the arbitration process is started.

In the post-start processing of the arbitration function, at a time point of time $T_1$, the value of the signal arb_req 34 is "0," and accordingly, the process proceeds from Step S120 to Step S121 illustrated in FIG. 12, and the value of the total_mask_count register 24 is not "0," and accordingly, the process proceeds to Step S126 so that the initialization process is performed. Then, in Step S124, counting of the arbitration prohibiting cycle enabled period is performed (see FIG. 16(k)). The process returns to Step S100 illustrated in FIG. 10 and proceeds again to the post-start processing of the arbitration prohibiting function illustrated in FIG. 12 through Steps S102 and S103.

At time $T_2$, a request is issued by the DMAC 230a, and a signal dma_req 30 of which the value of 0th bit is "1" is output from the DMAC 230a (see FIG. 16(c)). In response to this signal dma_req 30, the arb_req_sel module 27 allows the request, and the value of 0th bit of the signal dma_rdy 36 is changed to "1" (see FIG. 16(f)). In response to the value of the signal dma_rdy 36, the arb_req_ctl module 28 changes the value of the signal arb_req 34 to "1" (Steps S140 and S141 illustrated in FIG. 14) and sets the value of the signal dma_ack 37 to "1" that represents the permission status (see FIGS. 16(g) and 16(d)). Then, the value of the signal dma_rdy 36 is returned to "0."

Since the value of the signal arb_req 34 is "1," the arb_mask_ctl module 20 proceeds from Step S120 to Step S125 illustrated in FIG. 12 so that the arb_mask_ctl module 20 changes the value of the signal arb_mask 25 to "1 (High)" (See FIG. 16(i)) so as to start the arbitration prohibited period, and returns the value of the signal arb_req 34 to "0."

In addition, in Step S125, the arb_mask_ctl module 20 stores a value obtained by subtracting "1" from the value of the cycle_mask_time register 16 in the cycle_mask_count register 23. Then, the process proceeds to Step S124, and counting of an arbitration prohibiting cycle enabled period is performed.

Thereafter, the process returns to Step S100 illustrated in FIG. 10 and proceeds to the post-start processing of the arbitration prohibiting function illustrated in FIG. 12 through Steps S102 and S103, and then, the process proceeds to Step S123 through Steps S120, S121, and S122 so as to perform counting of the arbitration prohibited period (see FIG. 16(i)), and in Step S124, counting of the arbitration prohibiting cycle enabled period is performed (see FIG. 16(k)).

At time $T_3$, a request is issued by the DMAC 230b, and the signal dma_req 30 of which the value of 1st bit is "1" is output from the DMAC 230b (see FIG. 16(c)). However, since time $T_3$ is within the arbitration prohibited period (see FIG. 16(i)), this request is not accepted (Step S130 illustrated in FIG. 13 and Step S140 illustrated in FIG. 14). Accordingly, the value of the signal dma_rdy 36 is maintained to be "0." The request issued by the DMAC 230b is held in the arb_req_sel module 27.

At time $T_4$, the counting value of the cycle_mask_count register 23 becomes "0" so that the arbitration prohibited period ends (Step S122 illustrated in FIG. 12), and the value of the signal arb_mask 25 is changed to "0" in Step S127. Accordingly, the arbitration enabled period is started (see FIGS. 16(j) and 16(i)). Since it is in the arbitration enabled period, the value of 1st bit of the signal dma_rdy 36 of the arb_req_sel module 27 is changed to "1" (Step S130 illustrated in FIG. 13), and the request of the DMAC 230b is accepted. In response to this, through Steps S140 and S141 illustrated in FIG. 14, the arb_req_ctl module 28 set the value of the signal arb_req 34 to "1."

In response to change of the value of the signal arb_req 34 to "1," the arb_mask_ctl module 20 sets the value of the signal arb_mask 25 to "1" so as to start the arbitration prohibited period. In accordance with the start of the arbitration prohibited period, counting of the arbitration prohibited period is started, and the value of the cycle_mask_count register 23 is decreased by one each time Step S123 of the flowchart illustrated in FIG. 12 is performed (see FIGS. 16(i) and 16(j)).

Next, at time $T_5$, requests are issued from the DMAC 230a and DMAC 230b, and the values of 0th bit and 1st bit of the signal dma_req 30 are changed to "1" (see FIG. 16(c)). Though time $T_5$ is within the arbitration prohibited period, the request of the DMAC 230a that is set as the arbitration prohibiting non-target is allowed (see FIGS. 16(e) and 16(f)). The request of the DMAC 230b is not allowed. When the request of the DMAC 230a is allowed, the arb_req_sel module 27 change the value of the signal dma_rdy 36 to "1" (Step S130 illustrated in FIG. 13). In response to this, the arb_req_ctl module 28 change the value of the signal arb_req 34 to "1" (Steps S140 and S141 illustrated in FIG. 14).

At time $T_6$, when the counting value of the total_mask_count register 24 becomes zero (see FIG. 16(k)), the arbitration prohibiting cycle enabled period ends and the process proceeds from Step S121 to Step S126 illustrated in FIG. 12 so that the values are initialized and the arbitration prohibiting cycle disabled period is started (see FIG. 16(h)).

When a request of the DMAC 230b is issued at time $T_7$, the arb_main_ctl module 26 changes the value of 1st bit of the signal dma_rdy 36 to "1" so as to allow the request (FIG. 16(f)). At this time point, it is within the arbitration prohibiting circle disabled period, and accordingly, the arbitration prohibited period is not started (see FIG. 16(i)).

Second Embodiment

Next, a second embodiment of the invention will be described. In the above-described first embodiment, in the second function, by ignoring the arbitration prohibiting function for a request from the DMAC having a highest priority, the transfer performance for the request of the DMAC of a high priority is improved. According to this second embodiment, when a request is issued from the DMAC of a high priority, the request is accepted by resetting the arbitration prohibited period or the arbitration prohibiting cycle enabled period. After that request is accepted, the arbitration prohibited period is restarted.

In addition, since the first and third functions presented in the above-described first embodiment can be directly applied to the second embodiment, the description thereof will not be presented here. In addition, the configuration of the arbiter 231 described with reference to FIG. 8 can be commonly applied to not only the first embodiment but also the second embodiment.

Figure 17:
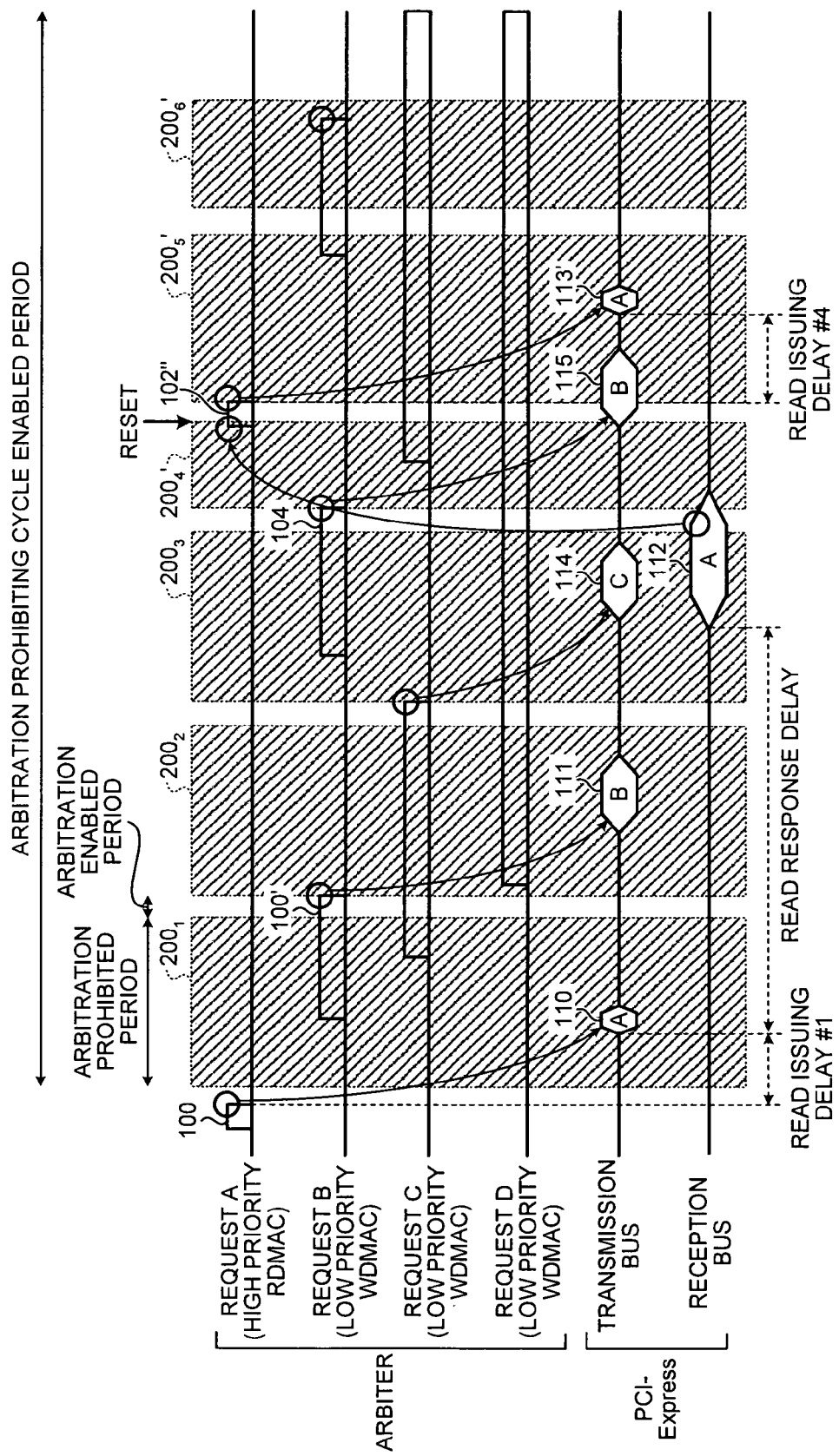
FIG. 17 is an exemplary timing diagram illustrating a second function according to the second embodiment of the invention.
Figure 18:
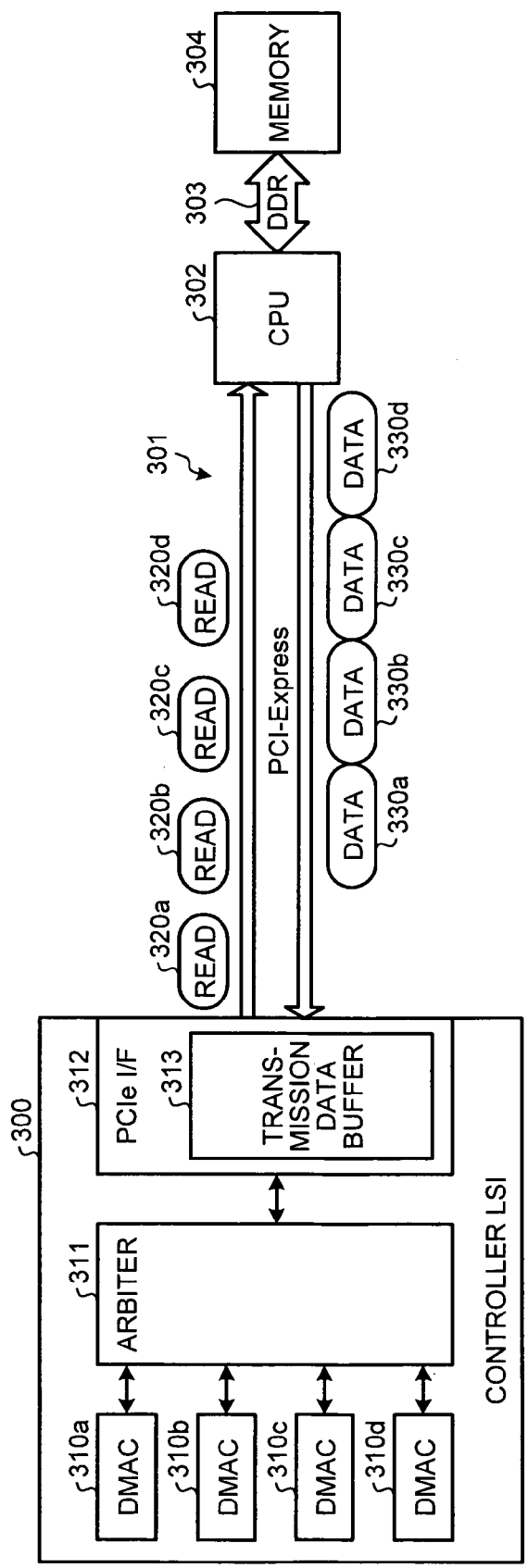
FIG. 18 is a schematic diagram illustrating a data transfer process using a plurality of DMACs having different priorities.
Figure 19:
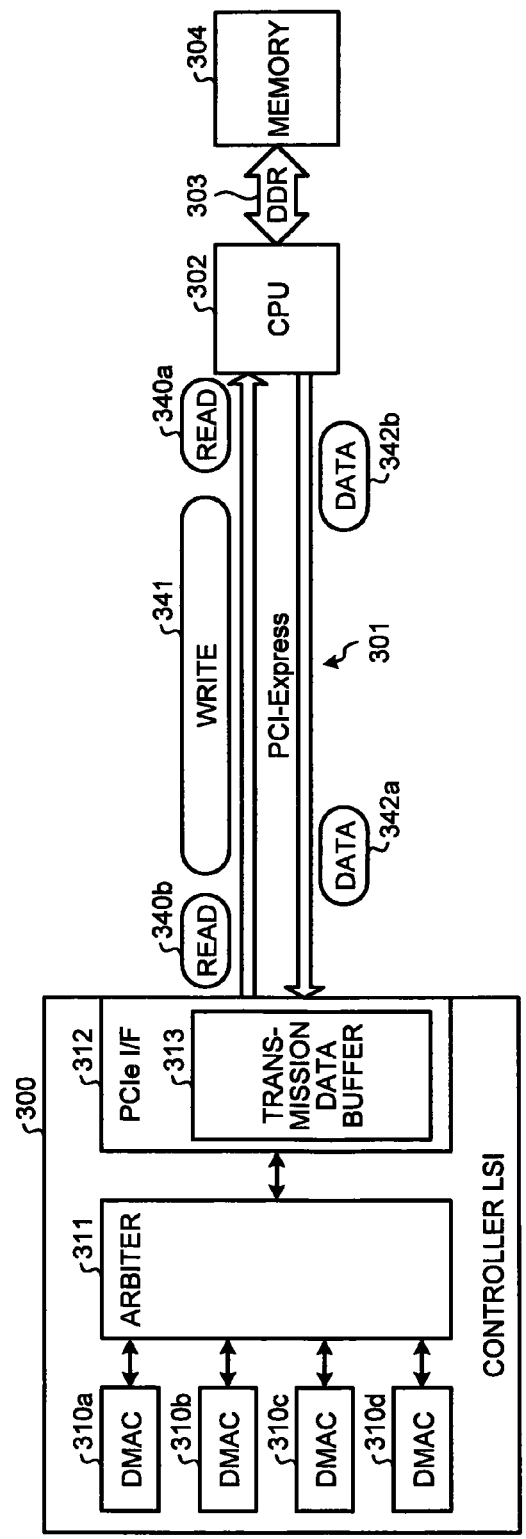
FIG. 19 is a schematic diagram illustrating data transfer in a case where an abnormal image is generated.

FIG. 17 is an exemplary timing diagram illustrating a second function according to the second embodiment. In FIG. 17, the same reference numeral is assigned to a portion that is common to FIG. 5 described above, and detailed description thereof will not be presented here. In the example illustrated in FIG. 17, at timing depending on timing of receiving the read data packet 112, a read request A102" is issued from the high priority RDMAC having a highest priority during the arbitration prohibited period $200_4'$.

At this time, in the second embodiment, the arbiter 231 resets the arbitration prohibited period $200_4'$, in other words, temporarily ends the arbitration prohibited period $200_4'$ to accept the read request A102" and transmit a read request packet 113' to the transmission bus. A delay (read issuing delay #4) until the read request packet 113' is transmitted after the read request A102" is accepted can be approximately the same as the read issuing delay #3 according to the second function in the above-described first embodiment. When the read request A102" is accepted, the arbitration prohibited period is restarted (an arbitration prohibited period $200_5'$)

As above, in the second function according to the second embodiment, similarly to the second function according to the above-described first embodiment, the read issuing delay of a request of a high priority is shortened, whereby the transfer performance is improved.

Other Embodiments

In the description presented above, although each embodiment is described to be performed by the controller LSI 222 that is hardware, the invention is not limited thereto and each embodiment may be realized by software. For example, the DMACs 230a to 230d are connected to the CPU 224 through a predetermined interface or directly. The CPU 224 executes a transfer control program read out from a ROM or the like not illustrated in the figure while using the memory 226 or the like as a work memory, and thereby realizing the function of the arbiter 231 illustrated in FIG. 8. The program is not limited to be read out from the ROM and may be supplied from a storage medium such as an HDD, a CD, or a DVD.

The transfer control program executed in each embodiment has a modular configuration including the arb_mask_ctl module 20 and the arb_main_ctl module 26 described above. As practical hardware, the CPU 224 reads out the transfer control program from a storage medium such as a ROM, an HDD, a CD, or a DVD not illustrated in the figure and executes the read-out program so that each module is loaded in a main storage device (for example, the memory 226), whereby the arb_mask_ctl module 20 and the arb_main_ctl module 26 are generated in the main memory device. For example, each register and each signal described above may be treated as variables of the transfer control program.

In addition, in the description presented above, although each embodiment of the invention has been described to be applied to an image forming apparatus, the invention is not limited thereto. For example, each embodiment of the invention can be applied to an image processing device that performs image processing such as moving image processing in which it is necessary to transmit image data of a predetermined amount within a predetermined time.

According to the invention, an advantage that the data transfer performance for a request having a high priority can be assured can be obtained.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data transfer device that controls data transfer performed through a bus capable of separately processing a request and a response, the data transfer device comprising:
a plurality of access control units that produce a data transfer process according to the request; and
an arbitration unit that performs arbitration between the requests issued by the plurality of access control units so as to determine a request to be accepted among those requests, the arbitration including repeatedly alternating between an arbitration prohibited period and an arbitration enabled period, the arbitration unit configured to accept a new request irrespective of (i) a number of outstanding requests whose corresponding responses have yet to be received and (ii) whether the arbitration unit is operating within the arbitration prohibited period, if a requesting one of the plurality of access control units is exempt from arbitration restrictions, wherein
the arbitration prohibited period is a period in which only the request issued by a high priority access control unit among the plurality of access control units is accepted and the requests issued by low priority access control units, whose priority is lower than the high priority access control unit, are prohibited, and
the arbitration enabled period is a period in which the requests issued by the plurality of access control units are accepted.

2. The data transfer device according to claim 1, wherein the arbitration unit provides an arbitration prohibiting cycle enabled period, in which the arbitration prohibited period and the arbitration enabled period are alternately repeated, and an arbitration prohibiting cycle disabled period, in which only the arbitration enabled period is included, and starts the arbitration prohibiting cycle disabled period after the arbitration prohibiting cycle enabled period ends.

3. The data transfer device according to claim 1, wherein the arbitration unit sets the access control unit that issues the request having a highest priority among the plurality of access control units as the designated access control unit.

4. The data transfer device according to claim 1, wherein the arbitration unit starts the arbitration prohibited period at a time point when the request is accepted in the arbitration enabled period.

5. A method of transferring data in which data transfer performed through a bus capable of separately processing a request and a response is controlled, the method comprising:
producing, by an access control unit, a data transfer process according to the request; and
arbitrating, by an arbitration unit, the requests, which are issued by a plurality of times of the producing, so as to determine a request to be accepted among those requests, the arbitrating including repeatedly alternating between an the arbitration prohibited period and an arbitration enabled period, the arbitration unit configured to accept a new request irrespective of (i) a number of outstanding requests whose corresponding responses have yet to be received and (ii) whether the arbitration unit is operating within the arbitration prohibited period, if a requesting one of the plurality of access control units is exempt from arbitration restrictions, wherein
the arbitration prohibited period is a period in which only the request issued in a designated time of the producing among the plurality of times of the producing is accepted and the requests issued outside of the designated time are prohibited, and
the arbitration enabled period is a period in which the requests issued by the producing time are accepted.

6. An image forming apparatus comprising:
a storage unit that stores image data;
an image forming unit that forms an image on a sheet based on the image data; and
a data transfer device that controls data transfer performed through a bus capable of separately processing a request and a response and that controls data transfer of the image data read out from the storage unit to the image forming unit, the data transfer device including,
a plurality of access control units that produce a data transfer process according to the request; and
an arbitration unit that performs arbitration between the requests issued by the plurality of access control units so as to determine a request to be accepted among those requests, the arbitration including repeatedly alternating between an arbitration prohibited period and an arbitration enabled period, the arbitration unit configured to accept a new request irrespective of (i) a number of outstanding requests whose corresponding responses have yet to be received and (ii) whether the arbitration unit is operating within the arbitration prohibited period, if a requesting one of the plurality of access control units is exempt from arbitration restrictions, wherein
the arbitration prohibited period is a period in which only the request issued by a high priority access control unit among the plurality of access control units is accepted and the requests issued by low priority access control units, whose priority is lower than the high priority access control unit, are prohibited, and
the arbitration enabled period is a period in which the requests issued by the plurality of access control units are accepted.

* * * * *